United States Patent
Turner

(10) Patent No.: US 8,465,597 B2
(45) Date of Patent: Jun. 18, 2013

(54) MODULAR RECYCLING CLEANING SYSTEM

(76) Inventor: John C. Turner, Putney (AU)

(*) Notice: Subject to any disclaimer, the term of this patent is extended or adjusted under 35 U.S.C. 154(b) by 504 days.

(21) Appl. No.: 12/698,225

(22) Filed: Feb. 2, 2010

(65) Prior Publication Data

US 2010/0192980 A1 Aug. 5, 2010

(30) Foreign Application Priority Data

Feb. 5, 2009 (AU) ................................ 2009900407

(51) Int. Cl.
- *B08B 3/02* (2006.01)
- *B08B 3/04* (2006.01)
- *B08B 5/04* (2006.01)
- *A47L 7/00* (2006.01)
- *A47L 11/34* (2006.01)

(52) U.S. Cl.
USPC ....... 134/115 R; 134/109; 134/172; 134/184; 134/198; 15/321; 15/328; 15/339; 15/412

(58) Field of Classification Search
USPC ............. 134/109, 110, 111, 115 R, 172, 184, 134/195; 15/321, 328, 339, 412
See application file for complete search history.

(56) References Cited

U.S. PATENT DOCUMENTS

| | | | |
|---|---|---|---|
| 1,982,345 A | | 11/1934 | Kirby |
| 2,643,732 A | * | 6/1953 | Keen ............................. 96/406 |
| 3,262,146 A | | 7/1966 | Hays |
| 3,464,081 A | * | 9/1969 | Wisner .......................... 15/321 |
| 3,896,521 A | | 7/1975 | Parise |
| 3,431,582 A | | 3/1980 | Soundheim |
| 4,320,555 A | | 3/1982 | Watson |
| 4,466,155 A | | 8/1984 | Grave |
| 4,934,017 A | * | 6/1990 | Kent ............................... 15/321 |
| 5,134,748 A | | 8/1992 | Lynn |
| 5,526,547 A | | 6/1996 | Williams et al. |
| 5,555,597 A | | 9/1996 | Berfield |
| 5,961,677 A | * | 10/1999 | Scott ........................... 55/385.1 |
| 6,206,980 B1 | | 3/2001 | Robinson |
| 6,789,290 B2 | | 9/2004 | Kent et al. |
| 7,073,226 B1 | | 7/2006 | Lenkiewicz et al. |
| 7,272,869 B1 | | 9/2007 | Robinson |

* cited by examiner

FOREIGN PATENT DOCUMENTS

EP 1 352 692 A1 10/2003
WO WO 2007063452 A2 * 6/2007

*Primary Examiner* — Michael Kornakov
*Assistant Examiner* — Natasha Campbell
(74) *Attorney, Agent, or Firm* — Brian C. Trask

(57) ABSTRACT

A modular recycling cleaning system comprising in combination: a pressure washing and control module, a vacuum motor assembly module, a reservoir module, an air/liquid separator module, a flexible hose system, a control system and a cleaning head, capable of being easily configured so as to function as any one of: a straight through pressure washer with cleaning liquid supplied from an external source; a straight through pressure washer with cleaning liquid supplied internally from an integral water reservoir; a recycling pressure washer with cleaning liquid being supplied and reused from an integral cleaning liquid reservoir replenished with cleaning liquid by means of a vacuum recovery system; a straight through pressure washer with recovery of contaminated cleaning liquid but without reuse; a conventional wet vacuum cleaning system or a conventional dry vacuum cleaning system. The appliance being capable of further configuration as a shampooing machine. Further preferred embodiments of the invention include the possible integration of a vane separator and/or a HEPA filter on the vacuum system exhaust; a coacting switch and control for the pressure pump and the vacuum recovery system such that maximum electric current draw remains below a threshold; IPX5 water resistance of the system; various filtering arrangements for both the air and the liquid drawn into the system and a compact coaxial hose set connecting the cleaner body to the hand piece.

30 Claims, 9 Drawing Sheets

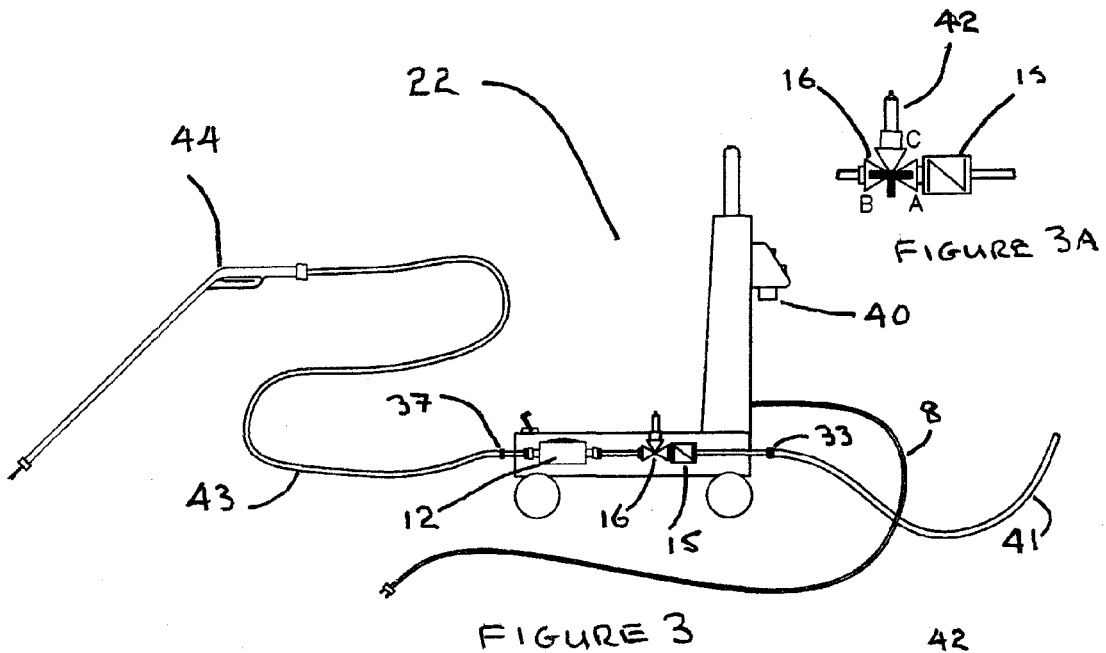
FIGURE 3
FIGURE 3A
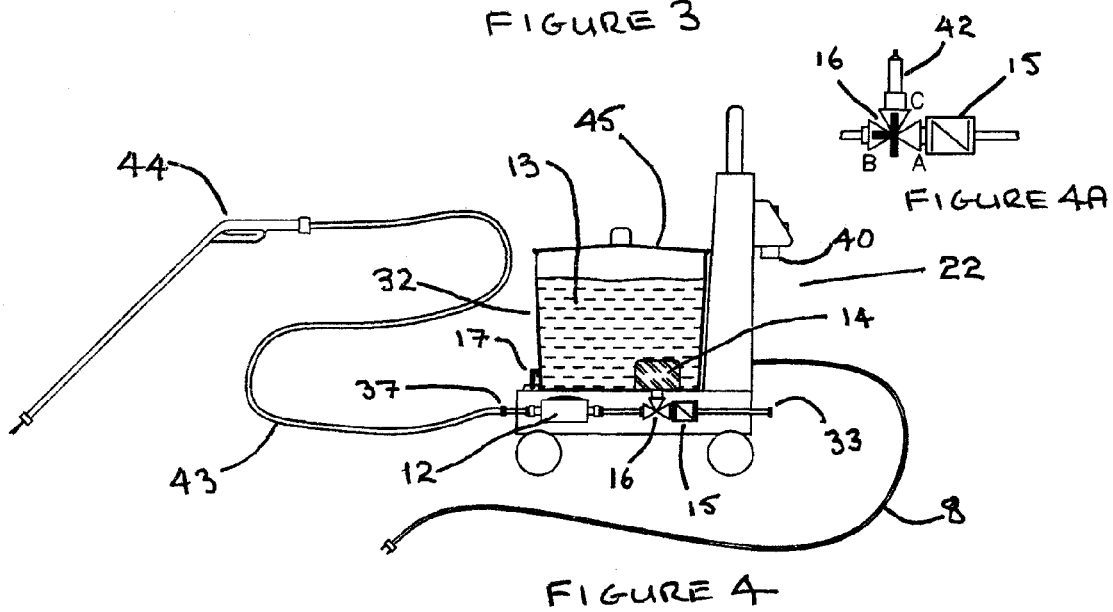
FIGURE 4
FIGURE 4A

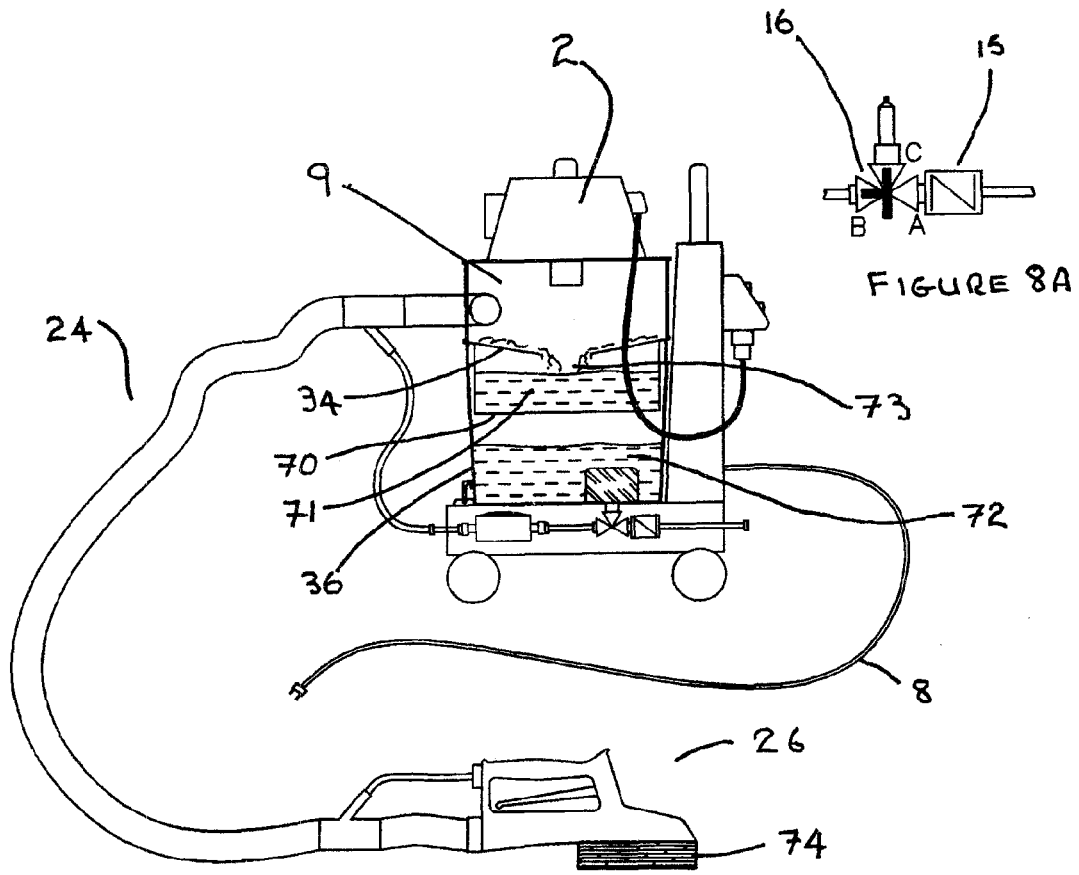
FIGURE 8A
FIGURE 8
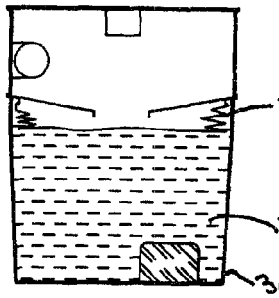
FIGURE 8B
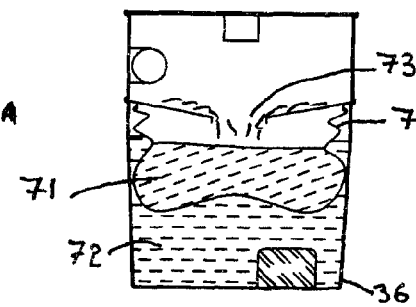
FIGURE 8C
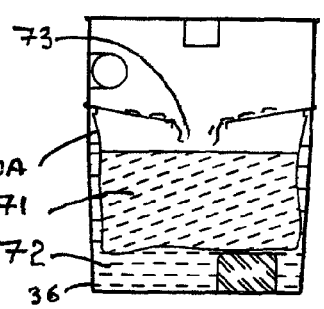
FIGURE 8D

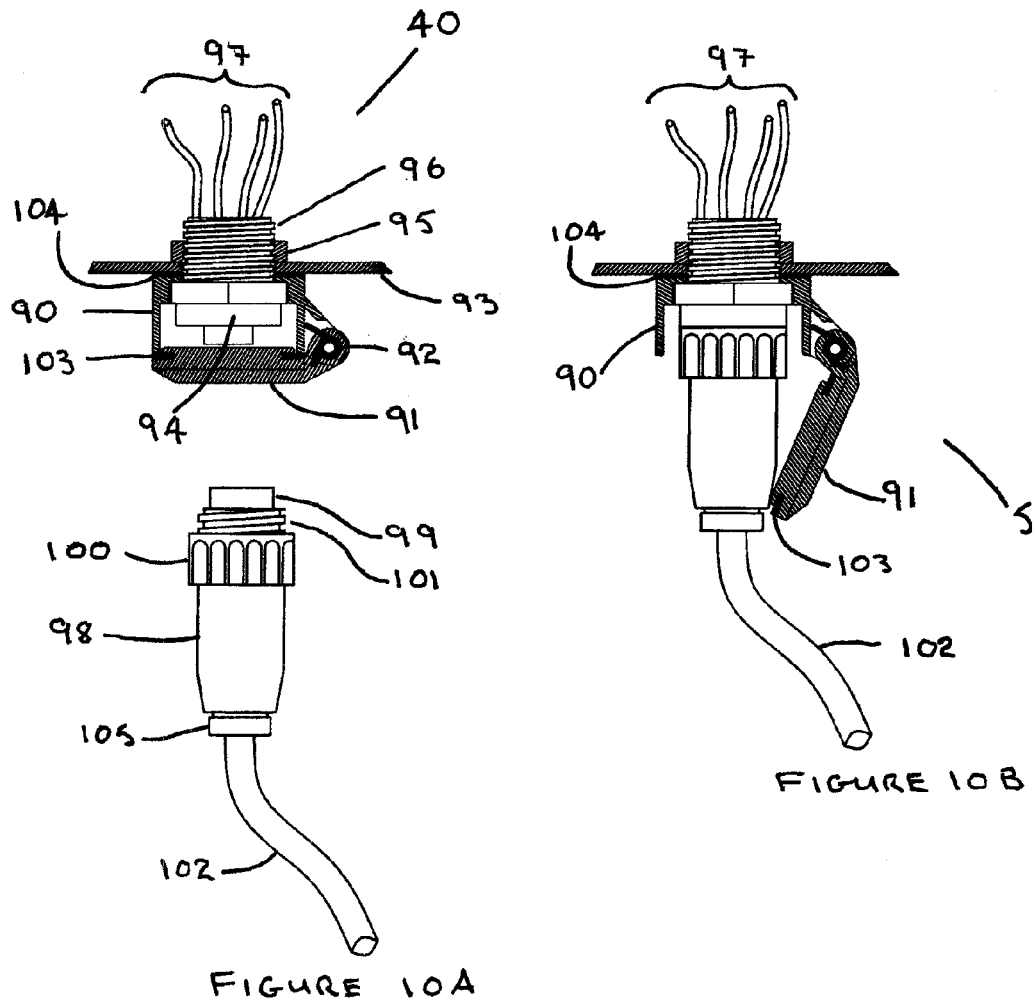
FIGURE 10A
FIGURE 10B
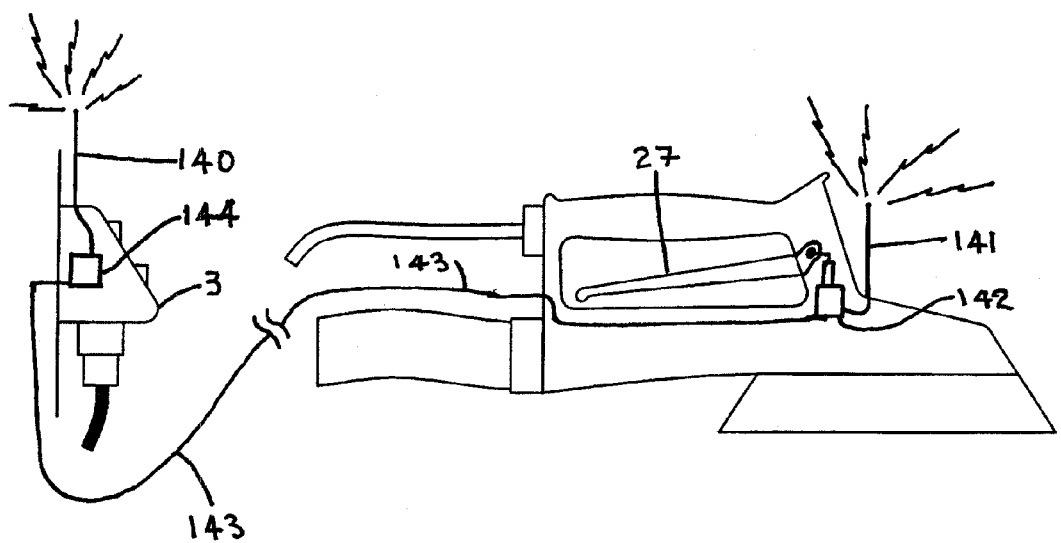
FIGURE 11

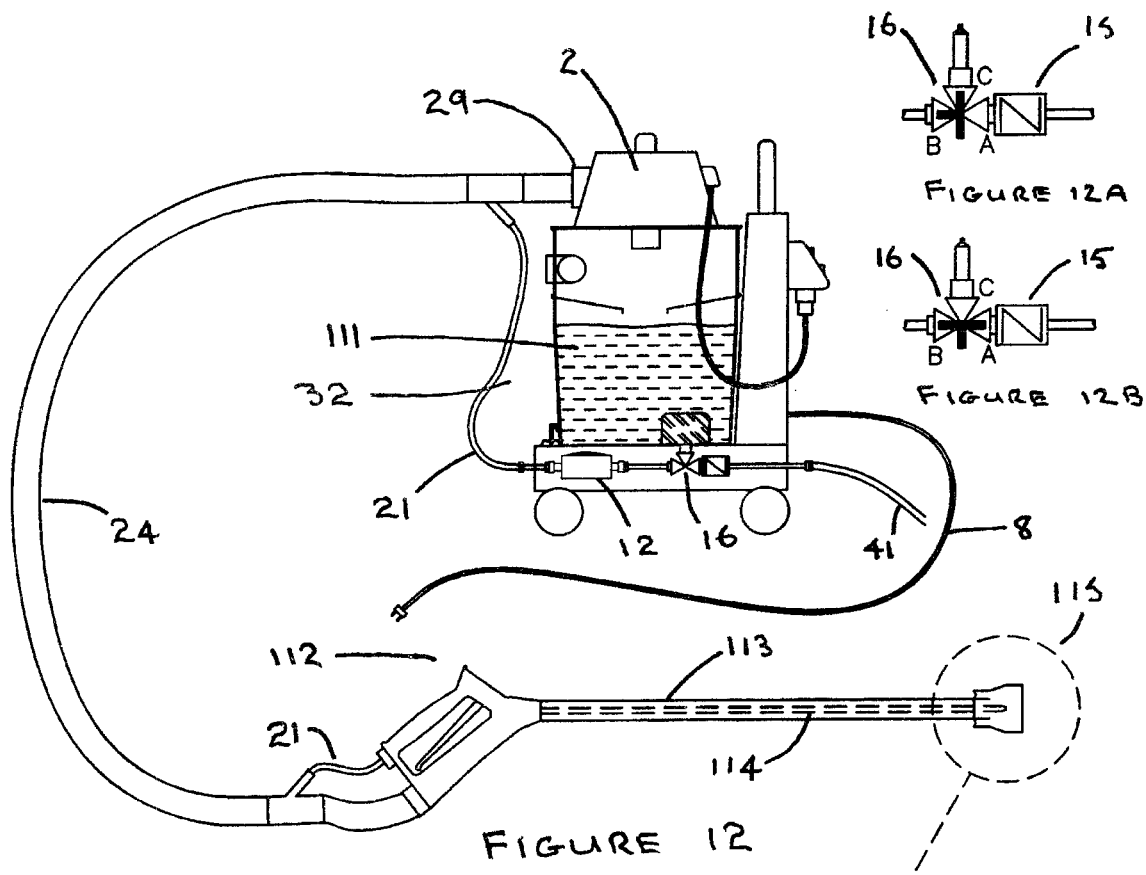
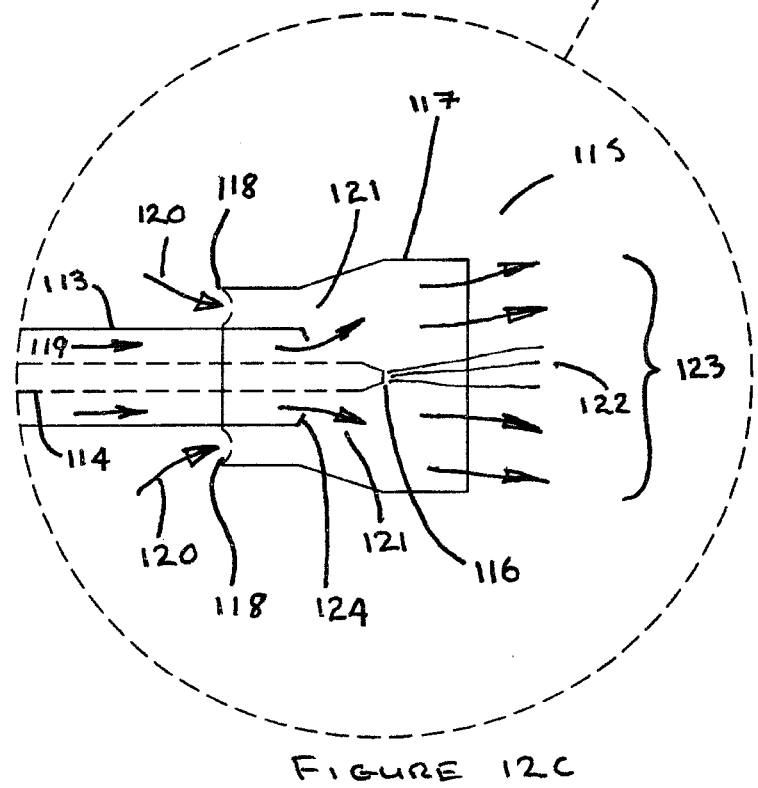
FIGURE 12
FIGURE 12A
FIGURE 12B
FIGURE 12C

MODULAR RECYCLING CLEANING SYSTEM

BACKGROUND

Related Applications

This application claims the benefit under 35 U.S.C. 119(a) of the filing date of Australia Provisional Application Serial No. 2009900407, filed Feb. 5, 2009, for "A Modular Recycling Cleaning System", the entire contents of which are hereby incorporated by this reference.

FIELD OF THE INVENTION

The present invention relates to water jet cleaning devices substantially for domestic use with a vacuum recovery system and in particular to such devices that can be easily reconfigured to function in different cleaning modes.

STATE OF THE ART

Water jet cleaners have been in use as appliances for many years. In recent years however the use of water jet cleaners has been restricted in areas suffering from water shortages such as many areas in Australia. A common restriction is the prohibition of running water jet cleaners connected directly to the reticulated water supply. Often in such areas water jet cleaners can be used provided the water supply is from a separate reservoir such as a bucket. However many water jet cleaners are not well suited to being operated in this mode because firstly the pump may be difficult to prime without a pressurised water supply and secondly the pump and reservoir, being separate items connected by a hose are awkward to move from one location to another. Water jet cleaners are available in a range of different capacities. In general the lower capacity and lower pressure types are used in the domestic environment with the higher capacity and pressure types being more suited to commercial and industrial applications. Pricing generally reflects the pressure and capacity.

Vacuum cleaners have also been in use as appliances for many years. The wet vacuum cleaner is designed to vacuum up liquids as well as solids or a mixture of both. These cleaners can generally be configured as dry vacuum cleaners as well by the addition of a filter to separate dust and other light airborne particulates from the air stream. Generally the particulate filters will be a paper cartridge or bag or a synthetic foam sleeve.

Shampooing machines designed to deliver a cleaning liquid to a target surface such as carpet (generally under relatively low pressure) and scavenge the contaminated cleaning liquid back to a holding tank by means of a vacuum recovery system are freely available for use by the general public. However their expense is such that general households would not purchase such appliances and they are generally hired when required. The hiring is relatively expensive and involves picking-up and return of a heavy cumbersome appliance. As a consequence they tend to be used only when absolutely necessary. If the features of a shampooing machine were available with a more versatile and more economically priced cleaning appliance then shampooing machines would enjoy more widespread use on a wider range of surfaces.

Recycling pressure washers, where the cleaning liquid is delivered under pressure to a target surface and then recovered for filtering and reuse by means of a vacuum recovery system are described in NZ 550711 and Aus 2006321235. These cleaners address the need for a cleaner capable of being used where water restrictions apply. The cleaners described within these specifications are integral units and not modular. They usefully combine a pressure washing action with a vacuum recovery action but do not appear to be well suited to reconfiguration to function in other cleaning modes.

Presently if consumers require a wet and dry vacuum appliance and a pressure washer they are obliged to purchase 2 separate appliances. There appears to be a need for a modular appliance capable of being purchased as a series of separate modules and capable of being easily configured in a number of distinct cleaning modes including a recycling mode.

Additionally there appears to be no cleaning appliance available—suitable for the domestic environment that combines an air blowing action with a pressure washing action in order to provide a relatively high energy combined phase flow for cleaning large surface areas such as exterior walls of buildings quickly. Such a cleaner especially if supplied as an add-on function to a versatile configurable cleaner would find a useful place in the market.

It is an object of the present invention to address or ameliorate some of the foregoing disadvantages and limitations or to at least provide the public with a useful choice.

Note

The term comprising (and grammatical variations thereof) is used in this specification in the inclusive sense of "having" or "including" and not in the exclusive sense of "consisting only of".

DEFINITIONS

Air/Liquid Separator Module. By the term air/liquid separator module we mean various components adapted to separate liquids and or solids from an air stream assembled such that the resultant assembly forms a modular unit that can be used with a cleaning machine as a means of separating liquids and or solids from the air stream drawn from the cleaning head.

Cleaning Head. By the term cleaning head we mean any hand held cleaning device in fluid communication via a flexible hose system with the body of a modular recycling cleaning system.

Combined Air/Liquid Blower. By the term combined air/liquid blower we mean a cleaning appliance that is adapted to deliver a high energy combined phase mixture of cleaning liquid and air from a suitable cleaning head to a target surface.

Easily Reconfigure. By the term "easily reconfigure" we mean to change the function of the appliance between the various modes described within this specification and to be able to do so quickly and easily and substantially without the use of tools such that any competent operator could effect a reconfiguration simply by following the written instructions provided. Examples of reconfiguration are given in the description.

Flexible Hose System. By flexible hose system we mean a flexible hose or an assembly comprising a plurality of flexible hoses connecting at one end to a modular recycling cleaning system body and at the other end to a cleaning head.

Cleaning Liquid (including additives). By "cleaning liquid" we mean the liquid used by a cleaner to effect the cleaning action. We also include any cleaning reagents or other additives that may be combined within the liquid. In general the cleaning liquid will be aqueous.

Contaminated Cleaning Liquid. By "contaminated cleaning liquid" we mean the cleaning liquid contaminated with dirt removed from the target surface by the cleaning action.

Modular Recycling Cleaning System. By modular recycling cleaning system we mean a multifunctional cleaning system comprising an appliance consisting of modules that can be configured so as to make a cleaning appliance with differing functions but including that of a recycling pressure washer.

Pressure Washing and Control Module. By the term pressure washing and control module we mean an assembly of components including at least: an outer body, a pump suitable for pressure washing, inlet piping for said pump, outlet piping for said pump, an external hose connection point, a switch and control for managing the operation of at least the pump motor and a power supply inlet generally in the form of a lead. Said components assembled such that the resultant assembly forms a modular unit that can be used with a cleaning machine as the base module to which other modules can be coupled.

Recycling Pressure Washer. By recycling pressure washer we mean a cleaning appliance consisting of:

a) A cleaner body comprising at least:

i. A reservoir for cleaning liquid from which a pump can draw.

ii. A pump that can draw cleaning liquid from the said reservoir to direct onto a target surface.

iii. A vacuum recovery system that scavenges the contaminated cleaning liquid from the target surface and draws it back to the reservoir for reuse.

iv. An air/liquid separator to effect separation of the contaminated cleaning liquid from the air being drawn back to the cleaner by the vacuum recovery system.

v. A filtering system for filtering the contaminated cleaning liquid returned to the reservoir prior to the liquid's reuse through the pump.

b) A hand held cleaning head c) A flexible hose system connecting the hand held cleaning head to the body of the cleaner Reservoir Module. By the term reservoir module we mean an assembly of components (including where appropriate a filtration assembly) forming a container assembled such that the resultant assembly forms a modular unit that can be used with a cleaning machine as a means of holding liquids and or solids and having a liquid outlet adapted to connect with a pressure pump inlet pipework.

Shampooing Machine. By shampooing machine we mean a cleaning appliance with a first reservoir of fresh cleaning liquid pumped from the reservoir to a cleaning head used for cleaning surfaces and a second reservoir of contaminated cleaning water drawn back from the said cleaning head such that the two reservoirs are separate and the cleaning liquid and the contaminated cleaning liquid do not mix.

Sliding Spigot Connection. By sliding spigot connection we mean a fluid tight connection between a socket and a spigot such that when the spigot is slid into and seals with the socket a valve arrangement within the socket assembly is automatically opened to allow fluid communication between the socket and the spigot. Said valve arrangement automatically closing when the spigot withdraws from the socket. Such an arrangement allows fluid communication between a source such as a reservoir and a sink such as a pump inlet to be established automatically by simply offering the socket up to the spigot.

Straight Through Pressure Washer. By the term "straight through pressure washer" we mean a pressure washer that utilises the cleaning liquid only once on a straight through basis with no recycle. Said cleaning liquid can originate from either an external source or from an integral reservoir.

Substantially For Domestic Use. By the term "substantially for domestic use" we mean particularly well suited and intended for domestic use but not intended to be exclusively for domestic use.

Vacuum Motor. By vacuum motor we mean a combined motor/fan assembly used for the purposes of providing a partial vacuum.

Vacuum Motor Assembly Module. By vacuum motor assembly module we mean an at least one vacuum motor (as defined herein) assembled with other components such that the resultant assembly forms a modular unit that can be used with a cleaning machine as a vacuum source and or as a source of pressurised air.

3-way Valve Assembly. By the term "3-way valve assembly" we mean a valve or plurality of valves configured such that fluid communication can be established at least between any 2 of at least 3 distinct points in a fluid circuit. Said 3-way valve assembly might be a single 3-way valve or a plurality of valves. Henceforth within this specification the terms "3-way valve assembly" and "3-way valve" are used interchangeably and have the same meaning.

BRIEF SUMMARY OF THE INVENTION

In a broad form of the invention there is a modular recycling cleaning system, substantially for domestic use, comprising in combination the components: a pressure washing and control module, a vacuum motor assembly module, a reservoir module, an air/liquid separator module, a flexible hose system, a control system and a cleaning head and wherein said modular recycling cleaning system is capable of being easily configured so as to function as any one of the following:

a. a straight through pressure washer with cleaning liquid supplied from an external source, b. a straight through pressure washer with cleaning liquid supplied internally from an integral water reservoir, c. a recycling pressure washer with cleaning liquid supplied internally from an integral cleaning liquid reservoir and wherein said reservoir is replenished with cleaning liquid by means of a vacuum recovery system and wherein said cleaning liquid is repeatedly reused, d. a straight through pressure washer with recovery of contaminated cleaning liquid wherein cleaning liquid is supplied from an external source and wherein the contaminated cleaning liquid is scavenged back to the cleaner body by means of said vacuum recovery system for collection in said reservoir module, e. a conventional wet vacuum cleaning system wherein said vacuum recovery system is utilised to collect liquids or material substantially in the wet state, f. a conventional dry vacuum cleaning system wherein said vacuum recovery system is utilised to recover material substantially in the dry state, and wherein said flexible hose system connects the body of said cleaning system to said cleaning head and wherein said vacuum motor assembly module, said reservoir module, said air/liquid separator module, said flexible hose system and said cleaning head are configured so as to be easily removable and whereby their removal can be effected by any competent person substantially without the use of tools and wherein said control system facilitates overall control of said cleaning system at least including electrical isolation of said cleaning system and its component motors.

Preferably said cleaning liquid pump within said pressure washing and control module, has a discharge pressure greater than 500 psi.

Preferably said cleaning system includes a 3-way valve assembly located on the inlet to the cleaning liquid pump that allows the pump to draw cleaning liquid from alternative sources.

Preferably a non-return valve or check valve is fitted between said 3-way valve assembly and an external hose connection point on the pressure washing and control module.

Preferably said recycling pressure washer can be further configured as a shampooing machine as defined herein, said shampooing machine having cleaning liquid supplied from a first integral primary cleaning liquid reservoir and wherein said vacuum recovery system is utilised to scavenge contaminated cleaning liquid and deliver to an integral secondary holding reservoir within said cleaning system and wherein said reservoirs are separated such that the cleaning liquid and the contaminated cleaning liquid do not mix.

Preferably said secondary holding reservoir is made from a substantially waterproof fabric such that when empty it occupies little volume and floats on top of said cleaning liquid within said primary cleaning liquid reservoir and when full or partially full of contaminated cleaning liquid said secondary holding reservoir expands within said primary cleaning liquid reservoir such that the total volume of the contaminated cleaning liquid and the unused cleaning liquid is substantially the same as the original volume of cleaning liquid held within the primary cleaning liquid reservoir.

Preferably said recycling pressure washer can be further configured as a combined air/liquid blower as defined herein, said combined air/liquid blower having the exhaust port of the vacuum motor assembly module as its source of pressurised air and the cleaning liquid pump as its source of pressurised cleaning liquid.

Preferably said combined air/liquid blower includes a cleaning head incorporating a venturi delivery nozzle wherein the high velocities of both the motive pressurised air and the cleaning liquid emerging from a spray nozzle within said venturi delivery nozzle create a low pressure zone within said venturi delivery nozzle that results in additional ambient air being drawn into said venturi delivery nozzle and added to the discharge from said venturi delivery nozzle.

Preferably a vane separator is adapted to the fit to the air exhaust port of said vacuum motor assembly module in order that any entrained liquid droplets in the exhaust stream from said vacuum motor assembly module are removed and collected.

Preferably a HEPA filter is adapted to fit to the air exhaust port of said vacuum motor assembly module in order that very small particulates in the exhaust stream from said vacuum motor assembly module are removed and collected.

Preferably a combination vane separator/HEPA filter is adapted to fit to the air exhaust port of said vacuum motor assembly module in order that any entrained liquid droplets and any very small particulates in the exhaust stream from said vacuum motor assembly module are removed and collected.

Preferably said vacuum motor assembly module is capable of being modulated in capacity and therefore electric current draw in a continuous or stepwise manner.

Preferably the pump within said pressure washing and control module is capable of being modulated in capacity and therefore electric current draw in either a continuous or stepwise manner.

Preferably said vacuum motor assembly module and the pump within said pressure washing and control module are capable of being modulated in a complimentary manner as defined herein and in either a continuous or stepwise manner such that the electric current draw of the cleaning system remains substantially constant and below a preset threshold.

Preferably said preset threshold is the maximum current allowable from a power supply outlet.

Preferably the modulation of said pump and/or said vacuum motor assembly is controlled by the position of the trigger in the hand piece of the cleaning head wherein a suitable positional transducer connected to the trigger communicates with a first switch and control located within the cleaner body that activates and controls the pump and/or the vacuum motor assembly module.

Preferably the communication between said positional transducer and said first switch and control located within the cleaner body is wireless.

Preferably the sum of the maximum electric current draws for all of the motors in said cleaning system is greater than the maximum electric current draw for said cleaning system as a whole.

Preferably a vane separator is used within said air/liquid separator module.

Preferably fluid connection between said reservoir module and said pressure washing and control module of the cleaner is accomplished by means of a sliding spigot connection as defined herein.

Preferably the vacuum motor assembly is electrically connected to the electrical supply from the body of the cleaner by means of a multipin plug and socket assembly meeting IPX5 water resistance specification and wherein said socket assembly retains an IPX5 water resistance specification when said plug is withdrawn.

Preferably said socket assembly comprises a multipin socket housed within a sealed cavity formed by an outer housing and spring loaded flap and wherein said socket assembly seals against the cleaner body such that said socket assembly and the connection to said cleaner body is water resistant to IPX5 water resistance level when the plug is withdrawn and said spring loaded flap closed.

Preferably said socket assembly is mounted substantially vertically to minimize the possibility of water entering said socket assembly.

Preferably a filter assembly located within said reservoir module is used to filter the water supply to the pump located within said pressure washing and control module.

Preferably said filter assembly contains a cartridge type filter.

Preferably a bag type filter manufactured from a porous filter fabric is used as a primary filter to filter the contaminated cleaning liquid before it presents to the said filter assembly for reuse.

Preferably said dry vacuum cleaning system utilises a removable cartridge filter or a porous bag filter assembly housed within the separator and reservoir modules to filter airborne particulates from the air stream before it enters the vacuum motor assembly module.

Preferably said bag filter assembly is comprised of a plurality of smaller bag filters as an array on a manifold and wherein each said smaller bag filter consists of a porous bag surrounding a rigid frame in the form of a spring and wherein the air travels through each said porous bag from the outside to the inside.

Preferably accumulated particulates can be shaken loose from said porous bags by imparting a rapid movement to said springs.

Preferably said rapid movement is imparted by means of a vibrator with a vibration frequency close to the natural frequency of vibration of said springs.

Preferably the connecting hose system comprises a large bore vacuum hose with a smaller diameter pressure hose for liquid routed through the inside of said vacuum hose such that they are coaxial.

Preferably said smaller diameter pressure hose is routed through the wall of said vacuum hose by means of split connector assemblies such that a seal is substantially formed between said smaller diameter pressure hose and said split connector assemblies in order to avoid vacuum leakage.

Preferably said air/liquid separator module contains a curved annular dish shaped baffle assembly with an array of holes or slots in it as is illustrated in FIG. 13 and wherein said baffle assembly has a top hat shaped central baffle as part of said assembly with a horizontal flat ring protruding over the central portion of the dish and wherein said curved annular dish shaped baffle assembly is adapted to collect liquid draining from the inside surface of the outer wall of the air/liquid separator and route it quickly into the reservoir module.

Preferably a plurality of curved annular dish shaped baffle assemblies are stacked vertically with a gap between each and wherein each lower dish has progressively smaller holes or slots.

In a further broad form of the invention there is provided a method for the provision of a number of a number of distinct cleaning modes within a modular cleaner that utilises in various combination: pressure washing, vacuuming, and blowing within a single cleaning system; said method including a combination of some or all of the following steps:

i. providing a pressure washing and control module, a vacuum motor assembly module, a reservoir module, an air/liquid separator module, a flexible hose system, a control system and a cleaning head, for use with said single cleaning system, ii. managing the operation of the various motors within said single cleaning system by means of said control system, iii. supplying pressurised cleaning liquid via a first hose and cleaning head to effect a pressure washing action at said cleaning head, iv. supplying vacuum pressure via a first hose and cleaning head so as to effect a vacuum cleaning action at said cleaning head, v. supplying pressurised air via a first hose and cleaning head to effect a blowing action at said cleaning head, vi. utilising said reservoir module in a multi functional manner for storing cleaning liquid, contaminated cleaning liquid, wet vacuumed liquid/solid mixtures or dry vacuumed solids, vii. providing a configurable inlet system to the pump such that said pump can draw liquid from either said reservoir or an external supply, and providing a filtration system to filter contaminated cleaning liquid prior to its use in the pump.

BRIEF DESCRIPTION OF THE DRAWINGS

Embodiments of the present invention will now be described with reference to the accompanying drawings wherein:

FIG. 3 is a schematic representation of a modular recycling cleaning system configured as a straight through pressure washer with water supplied from an external source according to a preferred embodiment of the invention.

FIG. 3A is a schematic representation of a 3-way valve configuration for the embodiment represented in FIG. 3.

FIG. 4 is a schematic representation of a modular recycling cleaning system configured as a straight through pressure washer with water supplied from an integral water reservoir according to a preferred embodiment of the invention.

FIG. 4A is a schematic representation of a 3-way valve configuration for the embodiment represented in FIG. 4.

FIG. 8 is a schematic representation of a modular recycling cleaning system configured as a shampooing machine according to a preferred embodiment of the invention.

FIG. 8A is a schematic representation of a 3-way valve configuration for the embodiment represented in FIG. 8.

FIGS. 8B, 8C and 8D are schematic representations of the reservoir system for a shampooing machine utilising a flexible reservoir.

FIG. 10A is an elevation and partially sectioned view of a multipin electrical plug and waterproof socket assembly shown with the plug withdrawn from the socket and a closed flap arrangement sealing the socket within a closed waterproof cavity.

FIG. 10B is an elevation and partially sectioned view of the multipin electrical plug and waterproof socket assembly shown in FIG. 10A but with the plug engaged with the socket.

FIG. 11 is a schematic representation of 2 forms of remote control arrangement between a cleaning head and the body of a modular recycling cleaning system.

FIG. 12 is a schematic representation of a modular recycling cleaning system configured as a combined air/liquid blower according to a preferred embodiment of the invention including a preferred form of cleaning head most suitable for the delivery of a combined high velocity water and air mixture.

FIG. 12A is a schematic representation of the 3-way valve configuration for a particular arrangement of the embodiment represented in FIG. 12.

FIG. 12B is a schematic representation of a 3-way valve configuration for another particular arrangement of the embodiment represented in FIG. 12.

FIG. 12C is an enlarged schematic representation of the venturi delivery nozzle on the cleaning head depicted in FIG. 12.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
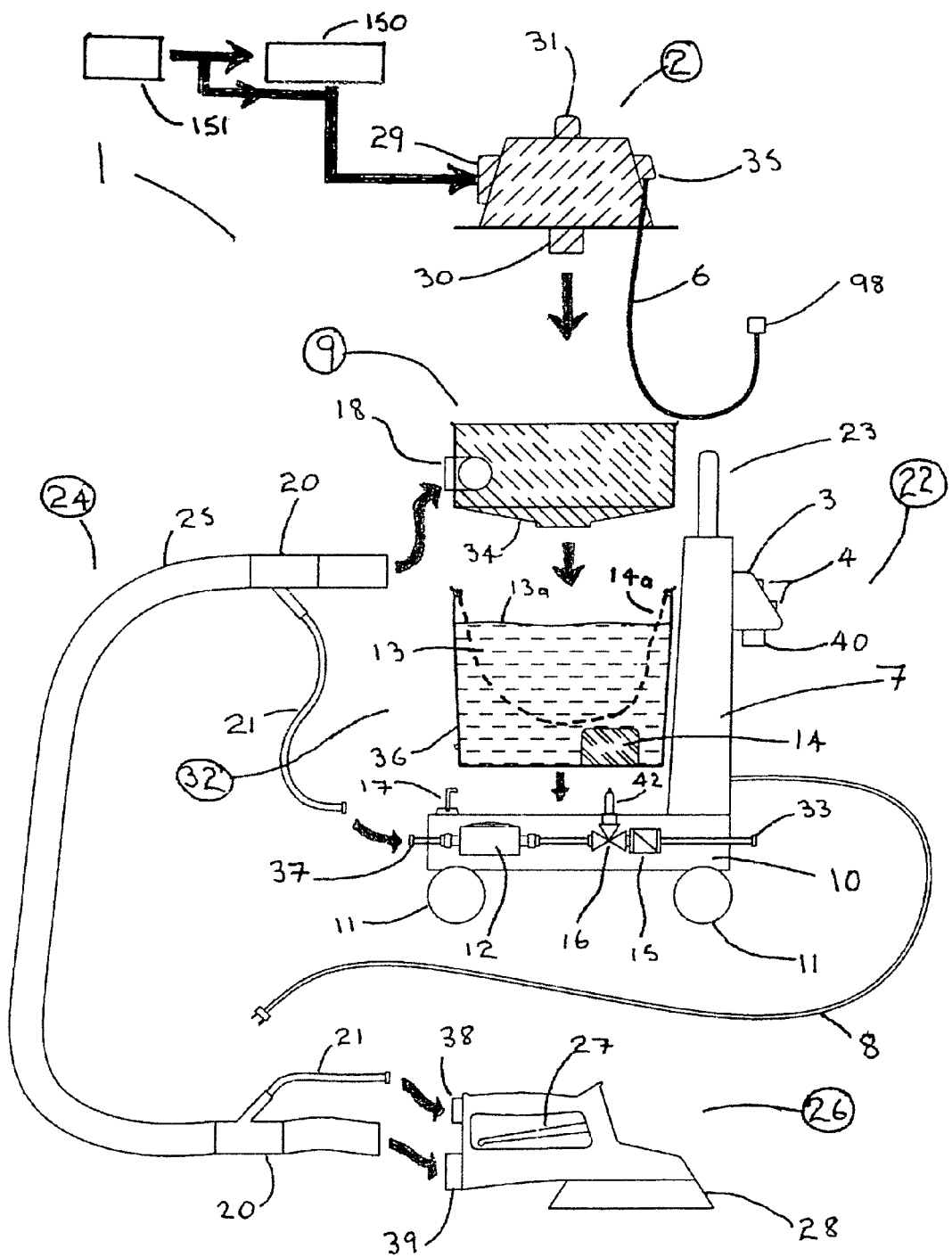
FIG. 1 is a schematic representation of an exploded view of a modular recycling cleaning system according to a preferred embodiment of the invention.

With reference to FIG. 1 there is shown in exploded view a preferred form of modular recycling cleaning system 1 comprising the following components: a vacuum motor assembly module 2, an air/liquid separator module 9, a reservoir module 32, a pressure washing and control module 22, a flexible hose system 24 and cleaning head 26. Said components adapted to fit together easily and substantially without the use of tools and generally as indicated by the arrows such that when assembled the reservoir module 32 sits on the pressure washing and control module 22, the separator module 9 in turn sits on the reservoir module 32, the vacuum motor assembly module 2 in turn sits on the separator module 9 and the flexible hose assembly 24 connects at a first end to the cleaner body thus formed from the assembled said modules and at a second end to the cleaning head 26. Said components are identified with circled numbers in FIG. 1. With reference to FIG. 2 there is shown the assembled cleaner thus formed.

Preferably the components described in the foregoing paragraph can be supplied to the consumer separately such that should the consumer only have need of a particular cleaning mode then they might only purchase the modules necessary to operate the cleaner in that mode. Additionally if at a later time they had a requirement for an additional cleaning mode then they could purchase the required modules to operate in that mode at that time.

Preferably said modular recycling cleaning system 1 includes a control system (not shown) for the overall control at least including electrical isolation of said cleaning system and its component motors. Preferably said control system is most conveniently substantially located within said pressure washing and control module 22 but it may be substantially located in the vacuum motor assembly module 2 or distributed between the 2 modules.

Preferably said cleaner assembly is water resistant to at least IPX5 water resistance level where IPX5 is the internationally recognised level 5 water resistance level. Preferably the vacuum motor assembly module 2 is held in position on the separator module 9 by means of suitable hand activated clips (not shown). Preferably the separator module 9 is held in position on the reservoir module 32 by means of suitable hand activated clips (not shown). Preferably the reservoir module 32 is held in position on the pressure washing and control module 22 by means of hand activated clips 17.

In another preferred form of modular recycling cleaning system the air/liquid separator module 9 and the reservoir module 32 are combined such that the separator components fit inside the upper region of the said reservoir module but remain removable.

Henceforth within this specification a reference to a separator module is a reference to an air/liquid separator module.

Again with reference to FIG. 1 the vacuum motor assembly module 2 has an electrical supply lead 6 for the at least one vacuum motor (not shown) contained within the said vacuum motor assembly module connecting at a first end to the said vacuum motor assembly module through a waterproof gland or the like 35 and at a second end to plug 98. Said plug 98 adapted to engage with a corresponding socket within socket assembly 40 on the pressure washing and control module 22. Preferably said assembled plug and socket are IPX5 water resistant.

Preferably said vacuum motor assembly module has a handle or the like 31 to assist with lifting the module away from the appliance. Said vacuum motor assembly module has an air inlet 30 located such that it is correctly positioned within the air/liquid separator module 9 when assembled and an air exhaust port 29.

Preferably said exhaust port is capable of being adapted to accept a flexible hose assembly so as to provide a blowing function through the said flexible hose assembly.

Still with reference to FIG. 1 the separator module 9 is adapted to fit between the vacuum motor assembly module 2 and the reservoir module 32. Preferably suitable handles (not shown) are provided on the said separator module to assist in separating it from and reassembling it with the reservoir module 32.

In its simplest form the said separator module is a cyclonic separator. Preferably said separator module has a tundish shaped baffle 34 at the bottom designed to collect the separated liquid from the air/liquid mixture entering the separator module at inlet 18. Preferably said baffle 34 also provides a barrier between the high velocity air circulating within the separator and the liquid surface 13a of the liquid 13 within the said reservoir module 32 such that the air stream does not disturb and/or re-entrain the liquid 13. Said inlet 18 is adapted to accept the end of a flexible hose assembly 24. Various baffle configurations can be used within the said separator module in order to improve the separation efficiency.

In one particular preferred embodiment a vane separator (not shown) is adapted to fit within the said separator module. Said vane separator providing superior air/liquid separation through the mechanism of changing the air/liquid direction of movement abruptly such that the liquid impinges on collection surfaces.

In another preferred embodiment a vane separator 150 is adapted to the fit to the air exhaust port 29 in order that any entrained liquid droplets in the exhaust stream from the vacuum motor assembly module are removed and collected.

In another preferred embodiment a HEPA (high efficiency particulate absorption) filter 151 is adapted to the fit to the air exhaust port 29 in order that very small particulates in the exhaust stream from the vacuum motor assembly module are removed and collected. With this refinement the appliance becomes more suited to use within critical environments such as hospitals.

In yet a further preferred embodiment a combination vane separator/HEPA filter 150 & 151 is adapted to the fit to the air exhaust port 29 in order that any entrained liquid droplets and any very small particulates in the exhaust stream from the vacuum motor assembly module are removed and collected. Said vane separator is fitted upstream of said HEPA filter such that the exhaust air stream is firstly cleaned of entrained water droplets before being filtered through the HEPA filter. With this refinement the appliance can be used as a recycling pressure washer or a wet vacuum cleaner whilst still being suitable for use within critical environments such as hospitals.

Still with reference to FIG. 1 in yet another preferred embodiment the conical shaped baffle 34 is replaced with a curved annular dish shaped baffle assembly shown as a perspective in FIG. 13. Said curved annular dish shaped baffle providing rapid draining of the separated liquid from the separator.

Figure 13A:
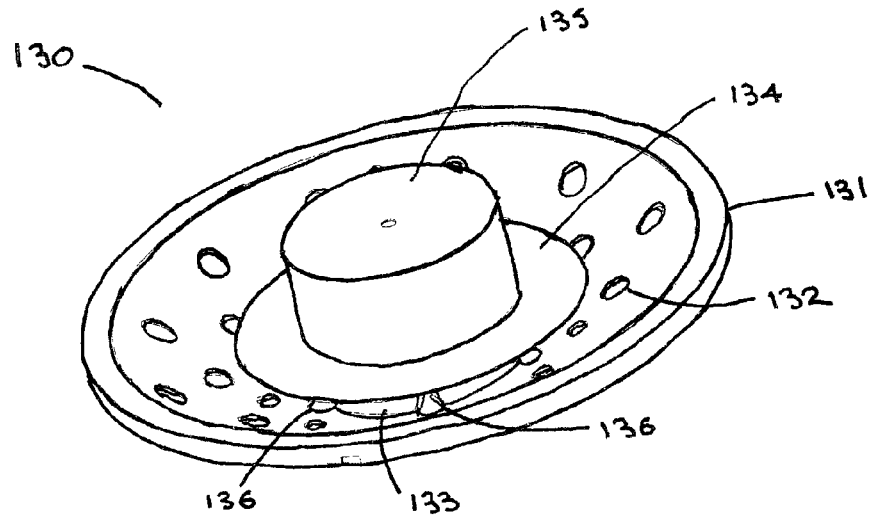
FIG. 13 is a perspective and a cross section of a preferred form of separating dish for use within an air/liquid separator module according to a preferred embodiment of the invention.

Now with reference to FIG. 13A there is shown a perspective of a curved annular dish shaped baffle assembly 130

(henceforth referred to as the dish). Said assembly comprising a curved dish 131 with drainage holes 132 distributed around the said dish as shown. A central cylindrical or near cylindrical wall 133 (shown mostly concealed) rises from the lowest level of the said dish. Drainage holes 136 are located at the said wall intersection with the lower surface of the dish as a regular array around the base of the wall.

Preferably a top hat shaped baffle 135 fits over the central cylindrical wall such that the rim 134 of the baffle 135 forms a horizontal flat surface protruding over the central portion of the dish.

In operation said dish collects liquid draining from the vertical wall at the extremity of a cyclonic separating chamber. Rivulets of said liquid continue to drain down the curved surface of the dish 131 until they intersect with a drainage hole or reach the bottom of the dish where they drain through the lower drainage holes 136. Flat rim baffle 134 prevents liquid being drawn up the inside wall 133 of the dish 131 by friction with high velocity air.

Preferably drainage holes 132 are sized to prevent any large solid particles (not shown) entrained with the air/liquid mixture from entering the reservoir. In this manner the assembly also acts as a separator for solids.

Preferably for more effective separation of solids especially when the solids are smaller in size, the holes 132 are replaced by radial slots (not shown). The dish 131 effectively becoming a slotted screen.

Figure 13B:
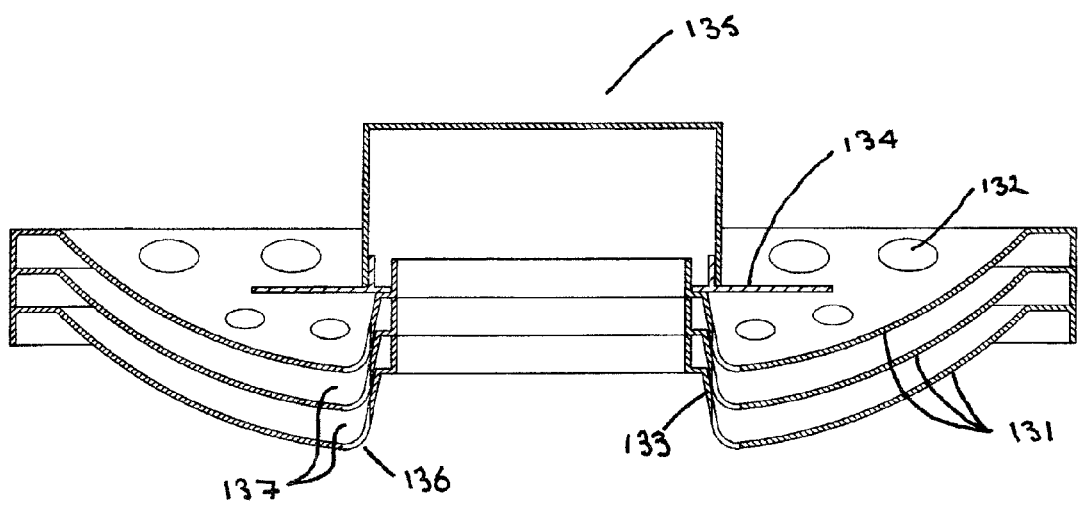

With reference now to FIG. 13B. In a further preferred embodiment a plurality of dishes are stacked vertically with gaps 137 between said dishes. Each lower dish having progressively smaller holes or slots in order to allow solid particulates to be trapped between the said dishes such that they cannot be re-entrained in the air stream as they might if they accumulated in a single dish. For most purposes however a single dish will suffice.

Now with reference again to FIG. 1 reservoir module 32 is comprised of a bucket like reservoir container 36 adapted to accept and retain a volume of cleaning liquid 13, typically water to which may be added a cleaning agent and/or a de-foaming agent.

Preferably the reservoir module 32 is adapted to fit onto the pressure washing and control module 22 such that a fluid connection is established between the liquid outlet of the reservoir module and the inlet pipework to the pump 12 located in the pressure washing and control module 22.

Preferably said fluid connection is effected by means of a sliding spigot connection as defined herein.

Preferably a filter assembly 14 is adapted to fit around the liquid exit from the bucket such that liquid being drawn from the reservoir by the pump is constrained to flow through the filter assembly before exiting the reservoir through the said fluid connection.

Preferably said filter assembly utilises a cartridge type filter to effect the filtration of the liquid.

Still with reference to FIG. 1 in a preferred embodiment of the invention a flexible bag filter 14a made from porous filter fabric is fitted between the separator module 9 and the reservoir container 36. Said bag filter acting as a primary filter to filter contaminated cleaning liquid as it returns to the reservoir container and before it presents to the filter assembly 14 for reuse.

Still with reference to FIG. 1 a preferred form of pressure washing and control module 22 is shown comprised of a handle and control section 7 fixed to a trolley section 10.

Preferably said handle and control section 7 has a removable or collapsible handle 23.

Preferably a control box 3 is mounted on the handle and control section 7. Said control box having at least isolating switches 4 for the motors contained within the cleaner body.

Preferably a socket assembly 40 adapted to accept the corresponding plug 98 on the vacuum motor assembly power supply lead 6 is mounted in a suitable location on the said handle and control section. More preferably the socket assembly 40 is mounted on the control box 3. Even more preferably the said socket assembly is mounted in a vertical orientation such that water cannot accumulate within the assembly.

Referring now to FIG. 10A and FIG. 10B there is shown a preferred form of multipin plug and socket assembly in the disengaged and engaged state. Referring to FIG. 10A the socket assembly 40 is comprised of the socket 94 housed within a sealed cavity formed by outer housing 90 and spring loaded flap 91 activated by spring 92. The said flap seals against the said housing with rubber or similar washer 103. Outer housing 90 seals against the outer surface of the control box wall 93 by means of rubber or similar washer 104. Compression of the washer is provided by tightening nut 95 on threaded section 96 of the socket 94. The plug 98 has a knurled rotatable section 100 integral with a male threaded section 101 adapted to engage with a corresponding female thread within the socket 94 to hold plug and socket firmly together. The conductive pins of the plug (not shown) are housed within a protective shroud 99. A multicore cable 102 enters the plug 98 through gland 105. The said plug engages with the said socket and seals to form a waterproof connection by means of an O-ring (not shown).

Referring now to FIG. 10B the connected plug socket assembly 5 is shown. Flap 91 is opened to allow access to the socket 94. Conductors (not shown) within multicore cable 102 make electrical connection with conductors 97 on the socket side of the connection. The arrangement described provides an IPX5 water resistant connection and an IPX5 water resistant socket assembly when the plug is withdrawn.

The foregoing 2 paragraphs describe the plug and socket assembly as it has been adapted for that particular design of multipin plug and socket. The outer housing and flap arrangement for the socket assembly however have equal application to other commonly available multipin plug/socket assemblies.

Referring again now to FIG. 1 the power cable 8 enters the handle and control section 7 through a suitable water resistant gland (not shown). Preferably said power cable enters the said handle and control section via a suitable gland mounted in the said control box.

Still with reference to FIG. 1 the trolley section 10 is mounted on wheels or skids or the like 11 so as to allow movement over a supporting surface. The pump 12 is located within the pressure washing and control module 22. The pump 12 can mount within the trolley section 10 as shown but equally it can mount partially or wholly within the handle and control section 7 depending on the geometry of the pump.

Preferably the pump inlet is connected directly to a 3-way valve assembly 16 that allows cleaning liquid to be drawn from either the reservoir module 32 or direct from an external supply through external hose connection point 33.

Preferably a non-return or check valve 15 is located between the said 3-way valve assembly and the external hose connection point 33 such that contaminated cleaning liquid cannot be drawn back into any connected external supply hose.

Preferably the fluid connection to the reservoir module is through spigot 42 forming part of a sliding spigot connection.

Preferably the pump 12 has a discharge pressure between 2 and 3000 psi. In a high pressure form of the cleaner the pump discharge pressure is greater than 500 psi.

Preferably the outlet piping from pump 12 protrudes through the wall of the said trolley section to connection point 37 adapted to accept a suitable pressure hose 21.

In a preferred embodiment of the invention a flexible hose system connects the body of the cleaner to the cleaning head. Depending on the cleaning head and the mode of operation of the cleaner the said hose system may comprise a single hose or a plurality of hoses. Now with reference to FIG. 2 a flexible hose system 24 connects the body of the cleaner to the cleaning head 26. Said flexible hose system is comprised of a flexible outer vacuum hose 25 with a flexible pressure hose 21 running coaxially through the inside of the vacuum hose 25. In another preferred form of flexible hose system (not shown) comprising a plurality of hoses the hoses are parallel but not coaxial.

Preferably the said pressure hose enters and leaves the said vacuum hose through split connector assemblies 20.

Figure 9:
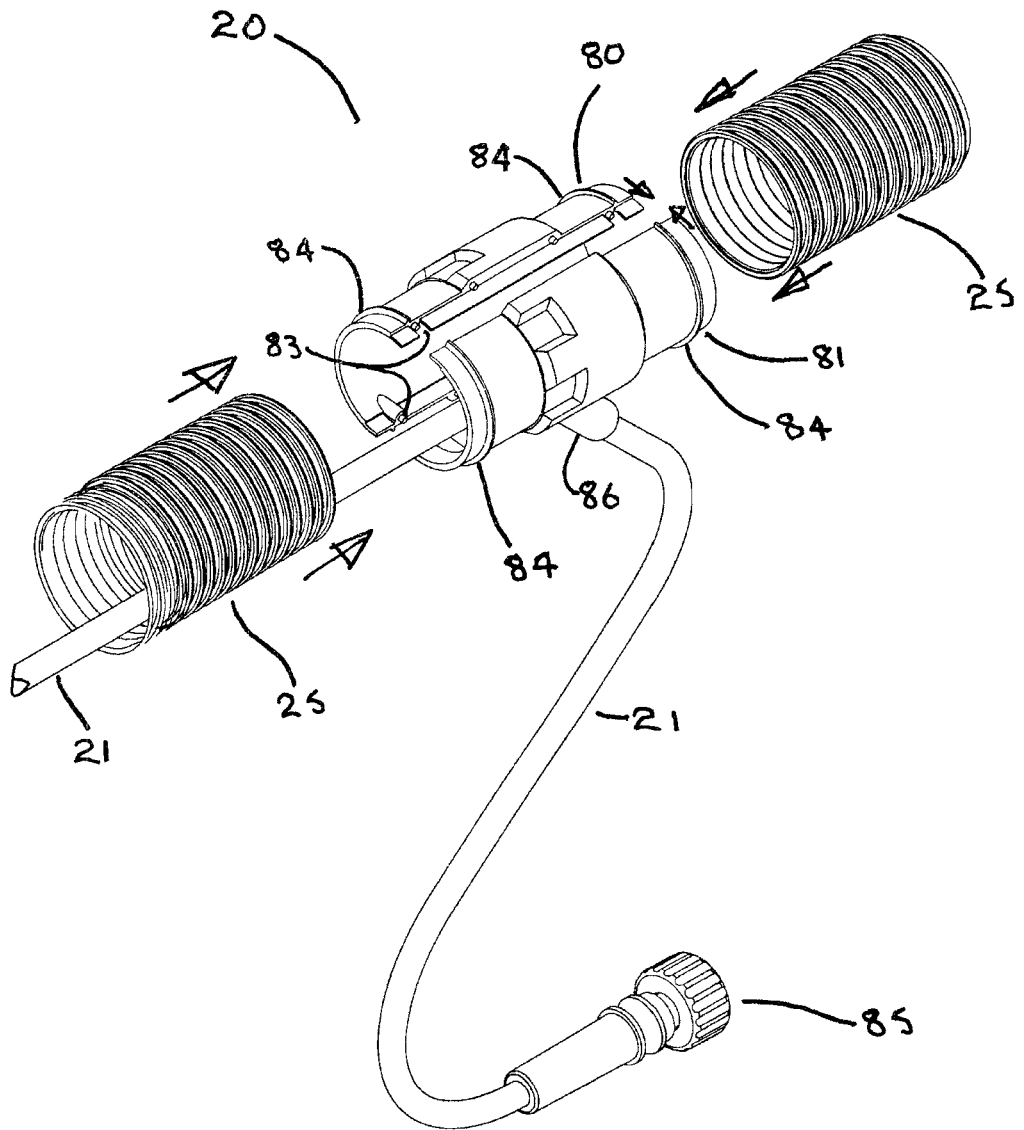
FIG. 9 is an exploded view of a preferred form of split connector assembly.

Referring now to FIG. 9 there is shown a preferred form of split connector assembly 20 as an exploded view.

Preferably the said split connector assembly is comprised of two opposing, minor image halves 80 and 81 such that when they are brought together they engage and form a larger cylindrical tube with another smaller cylindrical tube 86 intersecting with the said larger tube.

Preferably pressure hose 21 is routed through the said smaller cylindrical tube into the said larger tube such that the clearance between the outside diameter of the pressure hose 21 and the inside diameter of the smaller tube 86 is small so as to provide an effective seal between the split connector assembly 20 and the pressure hose 21.

Preferably halves 80 and 81 have a series of small location pegs 83 to assist with correct alignment of the said halves.

Preferably flexible vacuum tubes 25 slide over the assembled halves of the said split connector assembly and are prevented from sliding back by means of ridges 84 engaging grooves within the said vacuum hoses.

Preferably the relative inside diameter of the vacuum hoses 25 to the outside diameters of the assembled split connector assembly and ridges thereon 84 is such that the split connector assembly is held firmly together by the said vacuum hoses and they cannot slip or work their way off the said split connector assembly 20.

In another preferred embodiment screw fasteners (not shown) or adhesive (not shown) is used to hold the two halves 80 and 81 together as an assembly.

With reference now to FIG. 3 there is shown in schematic form another preferred form of the invention configured as a straight through pressure washer with cleaning liquid supplied from an external source.

Preferably external supply hose 41 connects with the external hose connection point 33 located on the pressure washing and control module 22. Cleaning liquid, typically water, flows through the said external supply hose then through non-return valve 15, 3-way valve assembly 16 and thence into pump 12. Pressurised cleaning liquid is discharged from the pump 12 through connection point 37 and into flexible hose system 43 and thence to cleaning head 44. Thus in this configuration of the cleaner it acts as a conventional pressure washer with cleaning liquid supplied from an external source.

Preferably, in this preferred form of the invention, said flexible hose system 43 comprises just a pressure hose.

Preferably said cleaning head in this preferred form of the invention comprises any pressure washing hand piece typically used with pressure washers.

Preferably power is supplied to the cleaner through power supply lead 8.

The vacuum motor assembly module, the air/water separator assembly module and the reservoir module are not required for this operational mode.

Preferably the socket assembly 40 for the vacuum motor assembly module power supply remains water resistant to IPX5 level by means of a self closing flap (not shown) as is described above within this specification.

Preferably the isolation switches for the at least one vacuum motor would be switched to off and the isolation switch for the pump 12 would be switched to on.

Still with reference to FIG. 3 and in particular the inset FIG. 3A. For the cleaner to be operated as a straight through pressure washer with cleaning liquid supplied from an external source the valve is configured as shown such that the external supply port A is connected to the outlet port B. The reservoir port C connected to spigot 42 is closed.

With reference now to FIG. 4 there is shown in schematic form another preferred form of the invention configured as a straight through pressure washer with cleaning liquid supplied internally from an integral water reservoir.

Preferably reservoir module 32 is located on the pressure washing and control module 22 and retained in place by means of clips 17. A lid 45 fits over the top of the reservoir module. The said reservoir module is filled with a suitable cleaning liquid 13 typically water. Fluid connection is established between the said reservoir module and the 3-way valve assembly 16 connected to the pump 12. The said cleaning liquid is drawn from the reservoir, through the filter assembly 14, thence through a sliding spigot connection (not shown) to port C of 3-way valve assembly 16 and thence into pump 12. Pressurised cleaning liquid is discharged from the pump 12 through connection point 37 and into flexible hose system 43 and thence to cleaning head 44. Thus in this configuration of the cleaner it acts as a conventional pressure washer but without dependence on an external liquid supply.

Preferably, in this preferred form of the invention, said flexible hose system 43 comprises just a pressure hose.

Preferably said cleaning head in this preferred form of the invention comprises any pressure washing hand piece typically used with pressure washers.

Preferably power is supplied to the cleaner through power supply lead 8.

The vacuum motor assembly module and the air/water separator assembly module are not required for this operational mode.

Preferably the socket assembly 40 for the vacuum motor assembly module power supply remains water resistant to IPX5 level by means of a self closing flap (not shown) as is described above within this specification.

Preferably the isolation switches for the at least one vacuum motor would be switched to off and the isolation switch for the pump 12 would be switched to on.

Still with reference to FIG. 3 and in particular the inset FIG. 4A. For the cleaner to be operated as a straight through pressure washer with cleaning liquid supplied internally from an integral water reservoir the valve is configured as shown such that the reservoir port C is connected to the outlet port B. The external supply port A is closed.

With reference now to FIG. 2 there is shown in schematic form another preferred form of the invention configured as a recycling pressure washer with cleaning liquid supplied internally from an integral water reservoir. Said reservoir is replenished with cleaning liquid for reuse by means of a vacuum recovery system.

Preferably vacuum motor assembly module 2 is located on separator module 9 and secured by means of clips (not shown). Combined vacuum motor assembly module 2 and separator module 9 are located on reservoir module 32 and secured by means of clips (not shown). Combined vacuum motor assembly module 2, separator module 9 and reservoir module 32 is located on the pressure washing and control module 22 and retained in place by means of clips 17. Fluid connection is established between the said reservoir module and the 3-way valve assembly 16 connected to the pump 12. Cleaning liquid 13, typically water, is drawn from the reservoir, through the filter assembly 14, thence through a sliding spigot connection (not shown) to port C of 3-way valve assembly 16 and thence into pump 12. Pressurised cleaning liquid is discharged from the pump 12 through connection point 37 and into pressure hose 21 forming part of flexible hose system 24 and thence to cleaning head 26. Thus in this configuration of the cleaner it acts as a pressure washer without dependence on an external liquid supply and with the added feature of contaminated cleaning liquid recovery and reuse.

Preferably vacuum motor assembly module is supplied with power from supply lead 6 and plug/socket assembly 5. Preferably said plug/socket assembly is water resistant to IPX5 level and as is described above in this specification.

Preferably, in this preferred form of the invention, said flexible hose system 24 comprises a pressure hose 21 running coaxially through vacuum hose 25 with the entry and exit of said pressure hose through split connector assemblies 20 as described above in this specification.

Preferably power is supplied to the cleaner through power supply lead 8.

Preferably the isolation switches 4 for the at least one vacuum motor and the pump 12 would be switched to on.

Figure 2A:
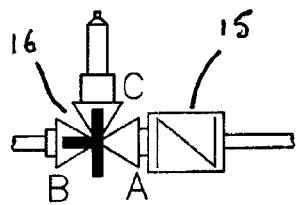
FIG. 2A is a schematic representation of a 3-way valve configuration for one of the preferred forms of the invention represented in FIG. 2.
Figure 2B:
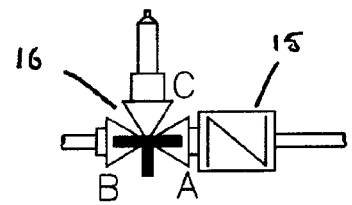
FIG. 2B is a schematic representation of a 3-way valve configuration for a second of the preferred forms of the invention represented in FIG. 2.
Figure 2:
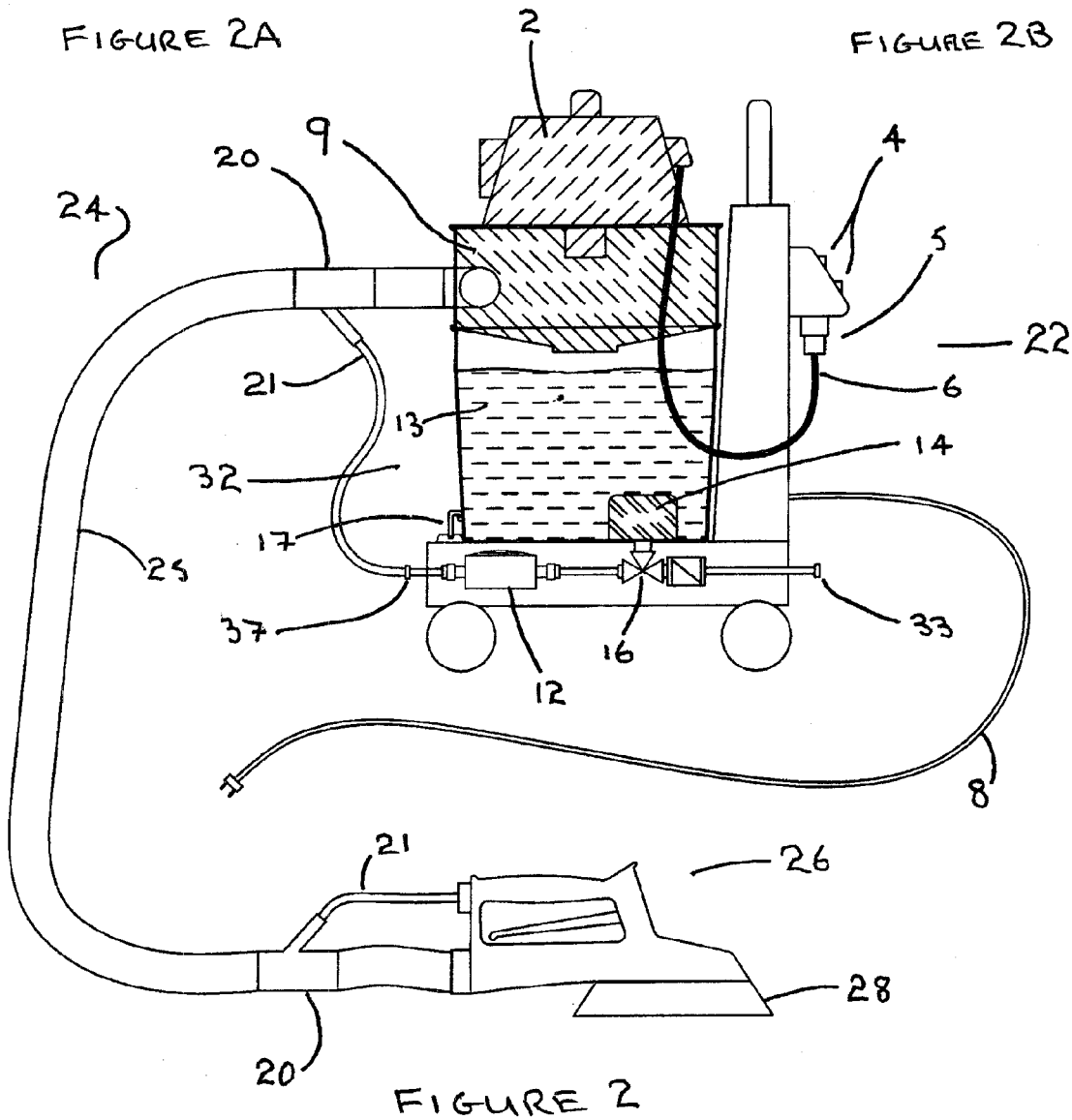
FIG. 2 is a schematic representation of a modular recycling cleaning system in assembled state configured as a recycling pressure washer according to a preferred embodiment of the invention.

Still with reference to FIG. 2 and in particular the inset FIG. 2A. For the cleaner to be operated as a recycling pressure washer with cleaning liquid supplied internally from an integral water reservoir the valve is configured as shown such that the reservoir port C is connected to the outlet port B. The external supply port A is closed.

In operation cleaning liquid 13 is drawn into pump 12 and delivered to cleaning head 26. Vacuum motor assembly module 2 supplies vacuum to air/liquid separator 9. Said vacuum is applied to the cleaning head 26 through hose assembly 24. An arrangement of brushes and/or flexible rubber or the like skirts 28 are adapted so as to confine the cleaning liquid within the said cleaning head and present it for scavenging back to the separator module 9 by the air flow associated with the vacuum. The contaminated cleaning liquid thus delivered to the said separator module is separated from the air stream and returned to the reservoir module 32 for reuse.

In a preferred embodiment of this form of the invention the vacuum provided by the vacuum motor assembly module can be modulated such that the electric current consumed by the vacuum motor assembly module is lower when the said module is being run at lower vacuum levels and higher when being run at higher vacuum levels.

In a preferred arrangement, modulation of the vacuum is achieved by utilising a plurality of vacuum motors and switching them on or off progressively so as to provide a staged vacuum supply.

In yet a further preferred arrangement, modulation of the vacuum is achieved by utilising an at least one variable speed vacuum motor and modulating its rotational speed so as to provide a smoothly modulated vacuum supply.

In a further preferred embodiment of the invention the pump can be modulated such that the electric current consumed by the pump is lower when the said pump is being run at lower capacities and higher when being run at higher capacities.

In a further preferred embodiment of the invention the vacuum motor assembly module is modulated in a complimentary manner to the pump such that as one increases in capacity and electric current consumption the other decreases in capacity and electric current consumption and the total electrical current draw remains relatively constant and always below a set maximum threshold.

In a preferred arrangement the pump switches on and off in a complimentary manner to a vacuum motor within the vacuum motor assembly module with a similar electric power rating such that when the pump is running the vacuum motor stops and when the pump stops the vacuum motor runs.

In a further preferred embodiment of the invention the sum of the individual maximum electric current draws of the vacuum motor assembly module and the pump is greater than the maximum electric current draw at any one time for the cleaner as a whole.

Preferably the said maximum threshold is equal to the maximum allowable electric current draw from the power supply outlet from which it is being supplied.

In a further preferred embodiment of the invention, modulation of the pump and/or the vacuum motor assembly module is directly controlled remotely from the cleaning head.

Preferably the trigger in the hand piece of the cleaning head communicates with a first switch and control located within the cleaner body that activates and controls the pump and/or the vacuum motor assembly module. Said control might be stepwise or fully modulating.

With reference to FIG. 11 in a preferred form of this embodiment the trigger in the hand piece 27 directly actuates a transducer 142 that is connected directly to the first switch and control 144 by means of electrical signal cable 143. Preferably the control signals used are a low, safe voltage such that no electrical safety hazard is created.

Still with reference to FIG. 11 in a further preferred form of this embodiment the transducer 142 has an in built battery power supply (not shown) and communicates through a wireless link to first switch and control 144 using aerials 141 in the hand piece and 140 located at a convenient location on the body of the cleaner. This arrangement providing superior safety and dispensing with the need for the electrical signal cable 143.

With reference again now to FIG. 2 and in particular the inset FIG. 2B. In another preferred form of the invention the cleaner can be configured as a straight through pressure washer with recovery of contaminated cleaning liquid.

Preferably the cleaner is configured as a recycling pressure washer as described in the foregoing paragraphs but with the following modifications:

i. 3-way valve assembly 16 is configured such that external supply port A is connected to outlet port B and reservoir port C is closed and ii. External supply hose (not shown) is connected to external hose connection point 33.

Thus the pump draws cleaning liquid from an external source and the vacuum recovery system is used to scavenge the contaminated cleaning liquid back to the separator module 9 for storage in reservoir module 32. In this mode of operation no recycling of the cleaning liquid occurs and liquid 13 shown within the reservoir module 32 is contaminated cleaning liquid.

With Reference now to FIG. 8 there is shown in schematic form another preferred form of the invention configured as a shampooing machine. The cleaner is configured exactly as a recycling pressure washer with cleaning liquid supplied internally from an integral water reservoir as described above in this specification but with the addition of a secondary reservoir 70 located within the cleaner body and above the cleaning liquid 72. The said cleaning liquid is located in the reservoir container 36. The said secondary reservoir is positioned directly below the separator module 9 and adapted to accept the contaminated cleaning liquid 73 being returned to the cleaner body from cleaning head 26 through hose assembly 24. Thus the lower portion of the reservoir module forms the primary reservoir and the upper portion forms the said secondary reservoir.

Preferably said secondary reservoir is sized so as to divide the available storage capacity roughly in the ratio of 6:4 for the primary and secondary reservoirs respectively.

Preferably the contaminated cleaning liquid 71 is prevented from mixing with the cleaning liquid 72.

Referring now to FIGS. 8B, 8C and 8D there is shown a preferred form of said secondary reservoir wherein it takes the form of a flexible yet substantially water tight reservoir. Preferably said flexible reservoir is made from a flexible fabric. Referring to FIG. 8B flexible secondary reservoir 70A is shown empty and floating on the cleaning liquid 72 within reservoir container 36. Now referring to FIG. 8C contaminated cleaning liquid 73 enters flexible reservoir 70A and is retained as a pool 71 within. The total of the cleaning liquid 72 and the contaminated cleaning liquid pool 71 being substantially equal to the original volume of cleaning liquid as shown in FIG. 8B. Now referring to FIG. 8D the pool of contaminated cleaning liquid 71 has increased such that a significant proportion of the cleaning liquid has been used and has been returned as contaminated cleaning liquid to the secondary reservoir. The total of the cleaning liquid 72 and the contaminated cleaning liquid pool 71 still being substantially equal to the original volume of cleaning liquid as shown in FIG. 8B. Thus the flexible secondary reservoir 70A starts off empty and gradually fills with returned contaminated cleaning liquid. The increasing volume of the flexible secondary reservoir being accommodated by the reducing cleaning liquid level within the reservoir container 36. In this manner the volume of the flexible secondary reservoir can be made substantially equal to the maximum volume of cleaning liquid within the reservoir container thus providing an efficient use of space within the cleaner.

Figure 5:
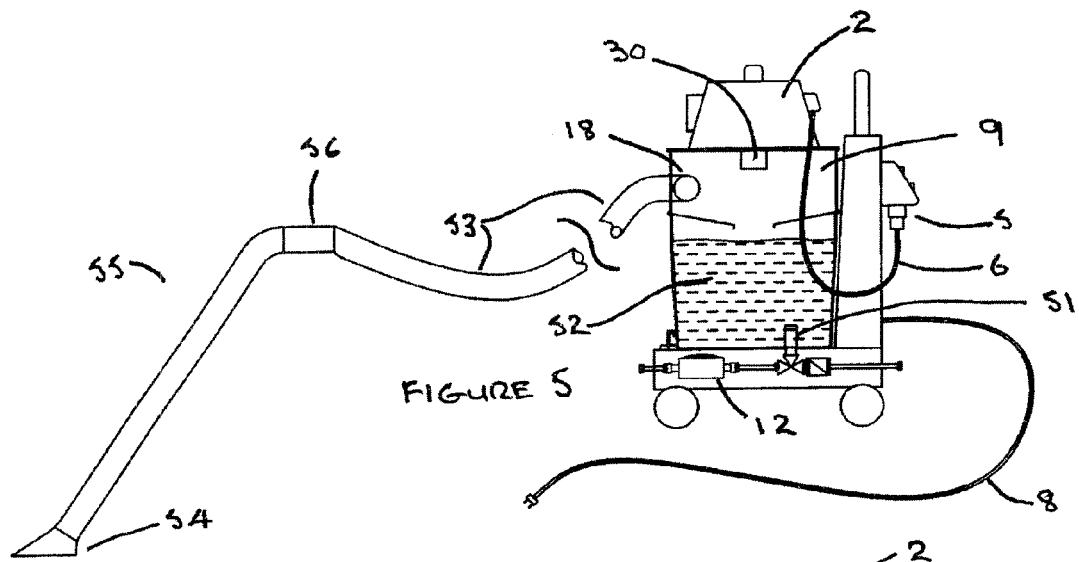
FIG. 5 is a schematic representation of a modular recycling cleaning system configured as a wet vacuum cleaning system according to a preferred embodiment of the invention.

With reference now to FIG. 5 there is shown in schematic form another preferred form of the invention configured as a conventional wet vacuum cleaning system wherein the vacuum recovery system is utilised to collect liquids or material substantially in the wet state and without the use of the pump 12.

Preferably the assembled vacuum motor assembly module, air/liquid separation module 9 and reservoir module 32 is located on the pressure washing and control module 22 and retained in place by means of clips 17. A cover 51 within the reservoir isolates the pump inlet pipework from the contaminated liquids and solids 52 that are collected in the reservoir.

Preferably the air/liquid separation module allows both solids and liquids to accumulate in the reservoir.

Preferably the inlet 18 to the separator module is tangential such that a cyclonic separation action is established.

Preferably vacuum motor assembly module 2 is supplied with power from supply lead 6 and plug/socket assembly 5.

Preferably said plug/socket assembly is water resistant to IPX5 level and as is described above in this specification.

Preferably, in this preferred form of the invention, said flexible hose system 53 comprises just a vacuum hose.

Preferably the cleaning head 55 in this preferred form of the invention comprises a hand piece 56 connected by a tube to a suitable foot 54 in the manner of a conventional vacuum cleaner.

Preferably power is supplied to the cleaner through power supply lead 8.

The pump is not required in this mode of operation. Preferably the isolation switches for the at least one vacuum motor are switched to on and the isolation switch for the pump 12 is switched to off.

Preferably the capacity of the vacuum motor assembly module can be modulated in either a stepwise or continuous manner.

Figure 6:
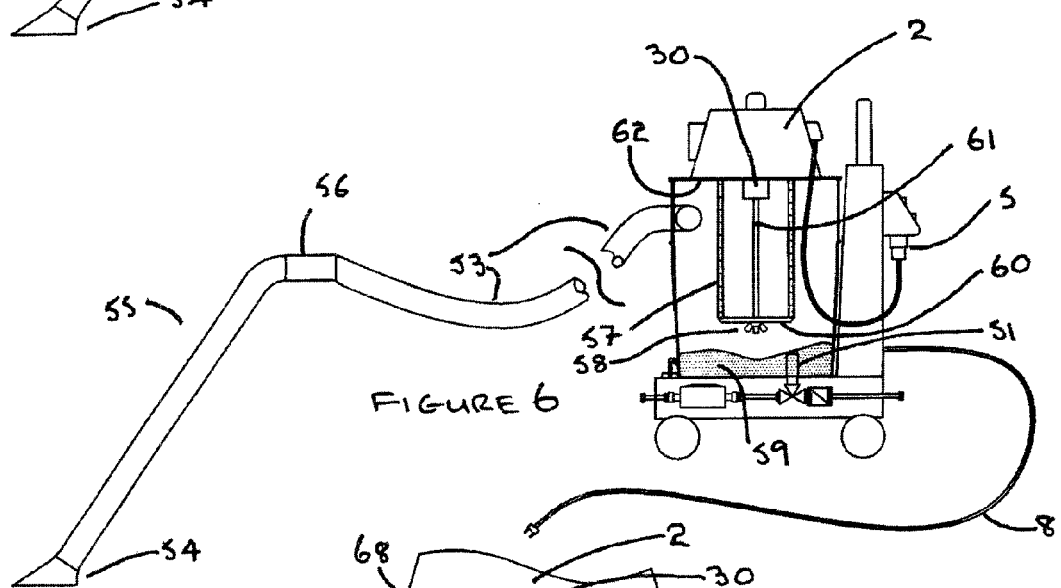
FIG. 6 is a schematic representation of a modular recycling cleaning system configured as a dry vacuum cleaning system according to a preferred embodiment of the invention.

With reference now to FIG. 6 there is shown in schematic form another preferred form of the invention configured as a conventional dry vacuum cleaning system wherein the vacuum recovery system is utilised to collect solid material substantially in the dry state and without the use of the pump 12.

Preferably the assembled vacuum motor assembly module, air/liquid separation module 9 and reservoir module 32 is located on the pressure washing and control module 22 and retained in place by means of clips 17. A cover 51 within the reservoir isolates the pump inlet pipework from the dust and other solid material 59 that is collected in the reservoir.

Preferably the air/liquid separation module has any baffles for liquid separation removed such that a dry filter 57 can be located over the air inlet to the vacuum motor assembly module 30. Said filter removing dust and other small particulates from the air stream before the air enters the vacuum motor assembly module 2.

Preferably said dry filter 57 takes the form of a paper cartridge filter. Said filter being clamped in place between the bottom surface of the vacuum motor assembly module 62 and a cover plate 60 by means of threaded rod 61 and wing nut 58.

Figure 7:
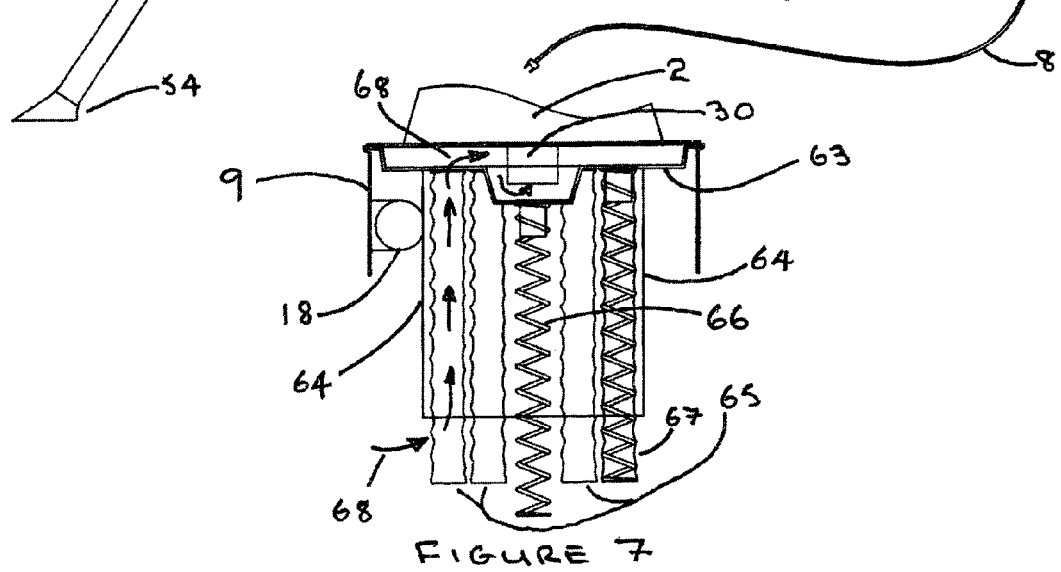
FIG. 7 is a schematic representation and partial cross section of a preferred form of dry filter.

With reference now to FIG. 7 there is shown in schematic and partially sectioned form of another preferred form of dry filter. A bag filter assembly or a plurality of bag filter assemblies 65 are adapted to fit onto manifold plate 63 located between vacuum motor assembly module 2 and separator module 9.

Preferably each bag filter assembly comprises a porous bag fitted over a rigid framework. Preferably said rigid framework is a spring such as is shown as 66. A filter assembly in cross section is shown as 67.

Preferably a cylindrical deflector plate 64 is located around the periphery of the at least one bag filter assembly such that incoming air and particulates from inlet 18 do not impinge directly on the at least one bag filter assembly.

Incoming air 68 (with particulates entrained) enters the cleaner body through inlet 18 and is drawn through the at least one bag filter assembly 65 thereby trapping particulates (not shown) on the outside. Filtered air then passes through the inside of the at least one bag filter assembly and into the inlet of the vacuum motor assembly module 30.

Preferably accumulated particulates can be shaken loose from the outside surface of the at least one bag filter assembly by imparting some rapid movement to the springs. In a preferred arrangement said rapid movement is imparted by means of an electrically driven vibrator (not shown) with vibration frequency close to the natural frequency of vibration of the springs.

Preferably the inlet 18 to the separator module is tangential such that a cyclonic separation action is established.

Preferably vacuum motor assembly module 2 is supplied with power from supply lead 6 and plug/socket assembly 5.

Preferably said plug/socket assembly is water resistant to IPX5 level and as is described above in this specification.

Preferably, in this preferred form of the invention, said flexible hose system 53 comprises just a vacuum hose.

Preferably the cleaning head 55 in this preferred form of the invention comprises a hand piece 56 connected by a tube to a suitable foot 54 in the manner of a conventional vacuum cleaner.

Preferably power is supplied to the cleaner through power supply lead 8.

The pump is not required in this mode of operation. Preferably the isolation switches for the at least one vacuum motor are switched to on and the isolation switch for the pump 12 is switched to off.

Preferably the capacity of the vacuum motor assembly module can be modulated in either a stepwise or continuous manner.

With reference now to FIGS. 12 and 12C there is shown in schematic form another preferred form of the invention configured as a combined air/liquid blower. Pump 12 delivers liquid through hose 21 routed through hose assembly 24 to cleaning head 112. Vacuum motor assembly module delivers pressurised air from exhaust port 29 through hose assembly 24 to cleaning head 112.

In operation the cleaning head delivers a high velocity air stream combined with a high velocity liquid stream 122. This high energy combined phase stream 123 providing superior cleaning characteristics where large areas are to be cleaned quickly or coated evenly with the liquid and where the deposits to be cleaned cannot be removed by an air blower alone.

In one preferred arrangement the cleaning liquid is supplied from an external source through external supply hose 41. In this preferred arrangement 3-way valve assembly 16 is configured as shown in inset FIG. 12B with external supply port A connected to outlet port B and reservoir port C closed.

In another preferred arrangement the cleaning liquid 111 is supplied from the integral reservoir module 32. In this preferred arrangement 3-way valve assembly 16 is configured as shown in inset FIG. 12A with reservoir port C connected to outlet port B and external supply port A closed.

Preferably power is supplied to the cleaner through power supply lead 8.

With reference now to FIG. 12C there is shown in schematic form a preferred form a venture delivery nozzle 115 on the cleaning head 112.

Preferably pressurised air 119 is delivered to the said venturi delivery nozzle through a tube 113 attached to the hand piece with pressurised cleaning liquid 122 being delivered through tube 114 running coaxially through tube 113 to a spray nozzle 116 located within the said venturi delivery nozzle.

Preferably a concentric outer nozzle housing 117 forms an annular shaped venturi at the end of tube 113 such that high velocity pressurised air 119 flowing down tube 113 creates a low pressure zone 121 at the end of tube 113.

Preferably the end of air delivery tube 113 is necked to a smaller internal diameter 124 such that the emerging air velocity is higher in order to provide a lower pressure in the low pressure zone 121.

Preferably spray nozzle 116 is correctly positioned relative to the end of tube 113 and outer shroud 117 thereby assisting in the creation of the low pressure zone 121 as high velocity liquid 122 is discharged from the said spray nozzle into the said venturi delivery nozzle.

Preferably an at least one opening 118 in the annular space between the outer housing 117 and tube 113 allows air 120 to be drawn into the low pressure region 121 of the said venturi delivery nozzle such that the additional air 120 mixes with the motive air 119 and the motive liquid 122 to form the said high energy combined phase stream 123.

The above describes only some embodiments of the present invention and modifications, obvious to those skilled in the art, can be made thereto without departing from the scope and spirit of the present invention. While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular recycling cleaning system, substantially for domestic use, comprising in combination the components:
   a. a cleaner body, comprising in various combination depending on the desired cleaning mode the components:
      i. a pressure washing and control module incorporating a cleaning liquid pump,
      ii. a vacuum recovery system utilising a vacuum motor assembly module and further incorporating an air exhaust port,
      iii. a reservoir module,
      iv. an air/liquid separator module,
      v. a cleaning liquid filter assembly,
      vi. a 3-way valve assembly,
   b. a flexible hose system,
   c. a cleaning head,
      and wherein said body includes a first switch and control for isolating and controlling electric motors incorporated within said modular recycling cleaning system such that one or more electric motor of said vacuum motor assembly module and an electric motor of said cleaning liquid pump are modulated in either a continuous or stepwise manner and wherein said modulation is complimentary such that as one increases in capacity and electric current consumption the other decreases in capacity and electric current consumption such that the electric current draw of the cleaning system remains substantially constant and below a preset threshold; said first switch and control being structured and arranged to cause the sum of individual maximum electric current draws for all electric motors in said cleaning system to be greater than the maximum electric current draw for said cleaning system as a whole at any one time and wherein said flexible hose system connects said cleaner body to said cleaning head and wherein said 3-way valve assembly is located on the inlet to said cleaning liquid pump such that said pump can draw cleaning liquid from said reservoir module or from an external source and wherein said filter assembly filters the cleaning liquid supply to said cleaning liquid pump whilst drawing cleaning liquid from said reservoir module and wherein said vacuum motor assembly module, said reservoir module, said air/liquid separator module, said flexible hose system and said cleaning head are easily removable without the use of tools and wherein said components can be used in various combinations such that said modular recycling cleaning system can function in any one of the following cleaning modes:
  a. a straight through pressure washer with cleaning liquid supplied from an external source through said 3-way valve assembly to said cleaning liquid pump,
  b. a straight through pressure washer with cleaning liquid supplied internally from said reservoir module through said 3-way valve assembly to said cleaning liquid pump,
  c. a recycling pressure washer with cleaning liquid supplied internally from said reservoir module through said cleaning liquid filter assembly and said 3-way valve assembly to said cleaning liquid pump and wherein said reservoir module is replenished with cleaning liquid by means of said vacuum recovery system utilising said vacuum motor assembly module and said air/liquid separator module and wherein said cleaning liquid is repeatedly reused,
  d. a straight through pressure washer with recovery of contaminated cleaning liquid wherein cleaning liquid is supplied from an external source through said 3-way valve assembly to said cleaning liquid pump and wherein the contaminated cleaning liquid is scavenged back to the cleaner body by means of said vacuum recovery system utilising said vacuum motor assembly module and said air/liquid separator module for collection in said reservoir module,
  e. a wet vacuum cleaning system wherein said vacuum recovery system utilising said vacuum motor assembly module and said air/liquid separator module is utilised to collect liquids or material substantially in the wet state for collection within said reservoir module,
  f. a dry vacuum cleaning system wherein said vacuum recovery system utilising said vacuum motor assembly module is utilised to recover material substantially in the dry state for collection within said reservoir module.

2. A modular recycling cleaning system, substantially for domestic use, comprising in combination the components:
  a cleaner body, comprising in various combination depending on the desired cleaning mode the components:
    i) a pressure washing and control module incorporating a cleaning liquid pump;
    ii) a vacuum recovery system utilising a vacuum motor assembly module and further incorporating an air exhaust port,
    iii) a reservoir module;
    iv) an air/liquid separator module;
    v) a cleaning liquid filter assembly; and
    vi) a 3-way valve assembly;
  a flexible hose system;
  a cleaning head;
  and wherein said body includes a first switch and control for isolating and controlling electric motors incorporated within said modular recycling cleaning system such that one or more electric motor of said vacuum motor assembly module and an electric motor of said cleaning liquid pump are modulated in either a continuous or stepwise manner and wherein said modulation is complimentary such that as one increases in capacity and electric current consumption the other decreases in capacity and electric current consumption such that the electric current draw of the cleaning system remains substantially constant and below a preset threshold; and wherein said flexible hose system connects said cleaner body to said cleaning head and wherein said 3-way valve assembly is located on the inlet to said cleaning liquid pump such that said pump can draw cleaning liquid from said reservoir module or from an external source and wherein said filter assembly filters the cleaning liquid supply to said cleaning liquid pump whilst drawing cleaning liquid from said reservoir module and wherein said vacuum motor assembly module, said reservoir module, said air/liquid separator module, said flexible hose system and said cleaning head are easily removable without the use of tools and wherein said components can be used in various combinations such that said modular recycling cleaning system can function in any one of the following cleaning modes:
  a. a straight through pressure washer with cleaning liquid supplied from an external source through said 3-way valve assembly to said cleaning liquid pump,
  b. a straight through pressure washer with cleaning liquid supplied internally from said reservoir module through said 3-way valve assembly to said cleaning liquid pump,
  c. a recycling pressure washer with cleaning liquid supplied internally from said reservoir module through said cleaning liquid filter assembly and said 3-way valve assembly to said cleaning liquid pump and wherein said reservoir module is replenished with cleaning liquid by means of said vacuum recovery system utilising said vacuum motor assembly module and said air/liquid separator module and wherein said cleaning liquid is repeatedly reused,
  d. a straight through pressure washer with recovery of contaminated cleaning liquid wherein cleaning liquid is supplied from an external source through said 3-way valve assembly to said cleaning liquid pump and wherein the contaminated cleaning liquid is scavenged back to the cleaner body by means of said vacuum recovery system utilising said vacuum motor assembly module and said air/liquid separator module for collection in said reservoir module,
  e. a wet vacuum cleaning system wherein said vacuum recovery system utilising said vacuum motor assembly module and said air/liquid separator module is utilised to collect liquids or material substantially in the wet state for collection within said reservoir module,
  f. a dry vacuum cleaning system wherein said vacuum recovery system utilising said vacuum motor assembly module is utilised to recover material substantially in the dry state for collection within said reservoir module;
  wherein the vacuum motor assembly is electrically connected to an electrical supply on said pressure washing and control module by means of a multipin plug and socket assembly meeting IPX5 water resistance specification and wherein said socket assembly retains an IPX5 water resistance specification when said plug is withdrawn.

3. The cleaning system of claim 2 wherein a non-return valve or check valve is fitted between said 3-way valve assembly and an external hose connection point on the pressure washing and control module.

4. The cleaning system of claim 2 wherein said recycling pressure washer can be further configured as a shampooing machine, said shampooing machine having cleaning liquid supplied from a first integral primary cleaning liquid reservoir and wherein said vacuum recovery system is utilised to scavenge contaminated cleaning liquid and deliver to a secondary reservoir within said cleaning system and wherein said primary cleaning liquid reservoir and said secondary reservoir are separated such that the cleaning liquid and the contaminated cleaning liquid do not mix.

5. The cleaning system of claim 4 wherein said secondary reservoir is made from a substantially waterproof fabric such that when empty it occupies little volume and floats on top of said cleaning liquid within said primary cleaning liquid reservoir and when full or partially full of contaminated cleaning liquid said secondary holding reservoir expands within said primary cleaning liquid reservoir such that the total volume of the contaminated cleaning liquid and the unused cleaning liquid is substantially the same as the original volume of cleaning liquid held within the primary cleaning liquid reservoir.

6. The cleaning system of claim 2 wherein said recycling pressure washer can be further configured as a combined air/liquid blower, said combined air/liquid blower having the exhaust port of the vacuum motor assembly module as its source of pressurised air and the cleaning liquid pump as its source of pressurised cleaning liquid.

7. The cleaning system of claim 6 wherein said combined air/liquid blower includes a cleaning head incorporating a venturi delivery nozzle wherein the high velocities of both the motive pressurised air and the cleaning liquid emerging from a spray nozzle within said venturi delivery nozzle create a low pressure zone within said venturi delivery nozzle that results in additional ambient air being drawn into said venturi delivery nozzle and added to the discharge from said venturi delivery nozzle.

8. The cleaning system of claim 1 wherein a vane separator is adapted to fit to the air exhaust port of said vacuum motor assembly module in order that any entrained liquid droplets in the exhaust stream from said vacuum motor assembly module are removed and collected.

9. The cleaning system of claim 2 wherein a HEPA filter is adapted to fit to the air exhaust port of said vacuum motor assembly module in order that very small particulates in the exhaust stream from said vacuum motor assembly module are removed and collected.

10. The cleaning system of claim 1 wherein a combination vane separator/HEPA filter is adapted to fit to the air exhaust port of said vacuum motor assembly module in order that any entrained liquid droplets and any very small particulates in the exhaust stream from said vacuum motor assembly module are removed and collected.

11. The cleaning system of claim 2 wherein said preset threshold is the maximum current allowable from a power supply outlet.

12. The cleaning system of claim 2 wherein the modulation of said pump and/or said vacuum motor assembly is controlled by the position of a trigger in a hand piece of the cleaning head wherein a positional transducer connected to the trigger communicates with a first switch and control located within the cleaner body that activates and controls said modulation.

13. The cleaning system of claim 12 wherein the communication between said positional transducer and said first switch and control located within the cleaner body is wireless.

14. The cleaning system of claim 2 wherein a vane separator is used within said air/liquid separator module.

15. A modular recycling cleaning system, substantially for domestic use, comprising in combination the components:
   a cleaner body, comprising in various combination depending on the desired cleaning mode the components:
      i) a pressure washing and control module incorporating a cleaning liquid pump;
      ii) a vacuum recovery system utilising a vacuum motor assembly module and further incorporating an air exhaust port,
      iii) a reservoir module;
      iv) an air/liquid separator module;
      v) a cleaning liquid filter assembly; and
      vi) a 3-way valve assembly;
   a flexible hose system;
   a cleaning head;
   and wherein said body includes a first switch and control for isolating and controlling electric motors incorporated within said modular recycling cleaning system such that one or more electric motor of said vacuum motor assembly module and an electric motor of said cleaning liquid pump are modulated in either a continuous or stepwise manner and wherein said modulation is complimentary such that as one increases in capacity and electric current consumption the other decreases in capacity and electric current consumption such that the electric current draw of the cleaning system remains substantially constant and below a preset threshold; and wherein said flexible hose system connects said cleaner body to said cleaning head and wherein said 3-way valve assembly is located on the inlet to said cleaning liquid pump such that said pump can draw cleaning liquid from said reservoir module or from an external source and wherein said filter assembly filters the cleaning liquid supply to said cleaning liquid pump whilst drawing cleaning liquid from said reservoir module and wherein said vacuum motor assembly module, said reservoir module, said air/liquid separator module, said flexible hose system and said cleaning head are easily removable without the use of tools and wherein said components can be used in various combinations such that said modular recycling cleaning system can function in any one of the following cleaning modes:
   a. a straight through pressure washer with cleaning liquid supplied from an external source through said 3-way valve assembly to said cleaning liquid pump,
   b. a straight through pressure washer with cleaning liquid supplied internally from said reservoir module through said 3-way valve assembly to said cleaning liquid pump,
   c. a recycling pressure washer with cleaning liquid supplied internally from said reservoir module through said cleaning liquid filter assembly and said 3-way valve assembly to said cleaning liquid pump and wherein said reservoir module is replenished with cleaning liquid by means of said vacuum recovery system utilising said vacuum motor assembly module and said air/liquid separator module and wherein said cleaning liquid is repeatedly reused,
   d. a straight through pressure washer with recovery of contaminated cleaning liquid wherein cleaning liquid is supplied from an external source through said 3-way valve assembly to said cleaning liquid pump and wherein the contaminated cleaning liquid is scavenged back to the cleaner body by means of said vacuum recovery system utilising said vacuum motor assembly module and said air/liquid separator module for collection in said reservoir module,
   e. a wet vacuum cleaning system wherein said vacuum recovery system utilising said vacuum motor assembly module and said air/liquid separator module is utilised to collect liquids or material substantially in the wet state for collection within said reservoir module,
   f. a dry vacuum cleaning system wherein said vacuum recovery system utilising said vacuum motor assembly module is utilised to recover material substantially in the dry state for collection within said reservoir module;

wherein fluid connection between said reservoir module and said pressure washing and control module of the cleaner is accomplished by means of a sliding spigot connection that is a fluid tight connection between a socket assembly and a spigot such that when the spigot is slid into and seals with the socket assembly a fluid tight connection is formed and a valve arrangement within the socket assembly is automatically opened to allow fluid communication between the socket and the spigot and wherein said valve arrangement automatically closes when the spigot withdraws from the socket.

16. The cleaning system of claim 2 wherein said cleaning liquid pump within said pressure washing and control module, has a discharge pressure greater than 500 psi.

17. The cleaning system of claim 2 wherein said socket assembly comprises a multipin socket housed within a sealed cavity formed by an outer housing and spring loaded flap and wherein said socket assembly seals against the cleaner body such that said socket assembly and the connection to said cleaner body is water resistant to IPX5 water resistance level when the plug is withdrawn and said spring loaded flap closed.

18. The cleaning system of claim 17 wherein said socket assembly is mounted substantially vertically to minimize the possibility of water entering said socket assembly.

19. The cleaning system of claim 2 wherein said cleaning liquid filter assembly is located within said reservoir module.

20. The cleaning system of claim 19 wherein said cleaning liquid filter assembly contains a cartridge type filter.

21. The cleaning system of claim 19 wherein a flexible bag filter manufactured from a porous filter fabric is used as a primary filter to filter the contaminated cleaning liquid before it presents to the said cleaning liquid filter assembly for reuse.

22. The cleaning system of claim 2 wherein said dry vacuum cleaning system utilises a removable cartridge filter or a porous bag filter assembly housed within the separator and reservoir modules to filter airborne particulates from the air stream before it enters the vacuum motor assembly module.

23. The cleaning system of claim 22 wherein said bag filter assembly is comprised of a plurality of smaller bag filters as an array on a manifold and wherein each said smaller bag filter consists of a porous bag surrounding a rigid frame in the form of a spring and wherein the air travels through each said porous bag from the outside to the inside.

24. The cleaning system of claim 23 wherein accumulated particulates can be shaken loose from said porous bags by imparting a rapid movement to said springs.

25. The cleaning system of claim 24 wherein said rapid movement is imparted by means of a vibrator with a vibration frequency close to the natural frequency of vibration of said springs.

26. The cleaning system of claim 2 wherein the flexible hose system comprises a large bore vacuum hose with a smaller diameter pressure hose for liquid routed through the inside of said vacuum hose such that they are coaxial.

27. The cleaning system of claim 26 wherein said smaller diameter pressure hose is routed through the wall of said vacuum hose by means of split connector assemblies such that a seal is substantially formed between said smaller diameter pressure hose and said split connector assemblies in order to avoid vacuum leakage.

28. The cleaning system of claim 2 wherein said air/liquid separator module contains a curved annular dish shaped baffle assembly with an array of holes or slots in it as is illustrated in FIG. 13 and wherein said baffle assembly has a top hat shaped central baffle as part of said assembly with a horizontal flat ring protruding over the central portion of the dish and wherein said curved annular dish shaped baffle assembly is adapted to collect liquid draining from the inside surface of the outer wall of the air/liquid separator and route it quickly into the reservoir module.

29. The cleaning system of claim 28 wherein a plurality of curved annular dish shaped baffle assemblies are stacked vertically with a gap between each and wherein each lower dish has progressively smaller holes or slots.

30. A method for the provision of a number of distinct cleaning modes within a modular cleaner structured according to claim 2, substantially for domestic use that utilises pressure washing and vacuuming within a single cleaning system;

the method comprising the following steps:
  i. providing a pressure washing and control module, a vacuum motor assembly module, a reservoir module, an air/liquid separator module, a filter assembly, a flexible hose system, a control system and a cleaning head, for use with said single cleaning system,
  ii. managing the operation of the various motors within said single cleaning system by means of said control system,
  iii. supplying pressurised cleaning liquid from said pressure washing and control module via a first hose and cleaning head to effect a pressure washing action at said cleaning head,
  iv. supplying vacuum pressure via a first hose and cleaning head so as to effect a vacuum cleaning action at said cleaning head,
  v. utilising said reservoir module simultaneously for the storing of cleaning liquid and as a receiving vessel for contaminated cleaning liquid returned from said cleaning head,
  vi. providing a configurable inlet system to said pressure washing and control module such that a pressure pump can draw liquid from either said reservoir module or from an external supply,
  vii. utilising said filter assembly to filter contaminated cleaning liquid prior to its use in the pressure pump.

* * * * *